(12) United States Patent
Bienn et al.

(10) Patent No.: US 8,619,637 B2
(45) Date of Patent: *Dec. 31, 2013

(54) MULTIPLE-TERMINATION ROUTING IN A WIRELESS NETWORK ENVIRONMENT WITH AN INTERNET PROTOCOL CORE

(75) Inventors: Marvin Bienn, Dallas, TX (US);
Jayshree A. Bharatia, Plano, TX (US);
Gary B. Stephens, Richardson, TX (US)

(73) Assignee: Apple, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,673

(22) Filed: Jun. 18, 2012

(65) Prior Publication Data
US 2013/0005316 A1    Jan. 3, 2013

Related U.S. Application Data

(63) Continuation of application No. 11/352,757, filed on Feb. 13, 2006, now Pat. No. 8,208,413.

(60) Provisional application No. 60/652,561, filed on Feb. 14, 2005, provisional application No. 60/661,163, filed on Mar. 11, 2005.

(51) Int. Cl.
*H04L 12/16* (2006.01)
*H04Q 11/00* (2006.01)
*H04M 11/00* (2006.01)

(52) U.S. Cl.
USPC ........... 370/270; 370/271; 370/352; 370/353; 370/354; 379/93.07; 379/93.11; 379/142.07

(58) Field of Classification Search
USPC ........ 370/260–271, 352–354; 379/70, 81, 82, 379/93.07, 93.11, 142.07, 156, 211.02, 379/212.01, 309
See application file for complete search history.

(56) References Cited

U.S. PATENT DOCUMENTS

| 6,032,043 | A  | 2/2000  | Houde |
| 6,058,178 | A  | 5/2000  | McKendry et al. |
| 6,278,874 | B1 | 8/2001  | Verdonk |
| 6,353,621 | B1 | 3/2002  | Boland et al. |
| 6,490,451 | B1 | 12/2002 | Denman et al. |
| 6,650,901 | B1 | 11/2003 | Schuster et al. |
| 6,763,233 | B2 | 7/2004  | Bharatia |
| 6,788,701 | B1 | 9/2004  | Mahalingaiah et al. |
| 6,795,444 | B1 | 9/2004  | Vo et al. |
| 6,888,803 | B1 | 5/2005  | Gentry et al. |
| 6,912,230 | B1 | 6/2005  | Salkini et al. |
| 6,978,003 | B1 | 12/2005 | Sylvain |
| 7,042,871 | B2 | 5/2006  | Gallant et al. |
| 7,099,342 | B2 | 8/2006  | Lee |

(Continued)

*Primary Examiner* — Michael Thier
*Assistant Examiner* — Benjamin H Elliott, IV
(74) *Attorney, Agent, or Firm* — Meyertons, Hood, Kivlin, Kowert & Goetzel, P.C.; Eric B. Meyertons

(57) ABSTRACT

Methods for multiple-termination routing in a wireless network environment that includes an Internet Protocol ("IP") core are described herein. One method includes receiving a call delivery request. The call delivery request includes a called number. The call features associated with the called number are determined. A determination is made whether the call features include multiple-termination routing information for a plurality of potential terminating devices. When the call features include the multiple-termination routing information including at least one termination to be routed utilizing Session Initiation Protocol ("SIP"), a call setup is initiated to each of the plurality of potential terminating devices.

17 Claims, 24 Drawing Sheets

(56) References Cited

U.S. PATENT DOCUMENTS

| | | |
|---|---|---|
| 7,107,047 B2 | 9/2006 | Florkey et al. |
| 7,136,679 B2 | 11/2006 | Beauford |
| 7,193,987 B2 | 3/2007 | Vilander |
| 7,260,384 B2 | 8/2007 | Bales et al. |
| 7,340,049 B2 | 3/2008 | Batni et al. |
| 7,343,161 B2 | 3/2008 | Shin |
| 7,369,545 B1 | 5/2008 | West et al. |
| 7,380,022 B2 | 5/2008 | Tell et al. |
| 7,420,960 B2 | 9/2008 | Somekh et al. |
| 7,426,265 B2 | 9/2008 | Chen et al. |
| 7,489,771 B2 | 2/2009 | McMurry et al. |
| 7,613,470 B2 | 11/2009 | Chin et al. |
| 7,630,481 B2 | 12/2009 | Kafka |
| 7,773,735 B2 | 8/2010 | Rudolph |
| 7,822,188 B1 | 10/2010 | Kirchhoff et al. |
| 8,208,413 B1 * | 6/2012 | Bienn et al. .................... 370/271 |
| 2001/0031635 A1 | 10/2001 | Bharatia |
| 2003/0169729 A1 | 9/2003 | Bienn et al. |
| 2003/0169768 A1 | 9/2003 | Bienn et al. |
| 2004/0170268 A1 * | 9/2004 | Hakusui ................... 379/211.02 |
| 2004/0176128 A1 | 9/2004 | Grabelsky et al. |
| 2004/0180654 A1 | 9/2004 | Chen |
| 2004/0235482 A1 | 11/2004 | Sylvain |
| 2004/0235483 A1 | 11/2004 | Sylvain |
| 2004/0247107 A1 | 12/2004 | Chen et al. |
| 2005/0018659 A1 | 1/2005 | Gallant et al. |
| 2005/0069097 A1 * | 3/2005 | Hanson et al. ............. 379/88.12 |
| 2005/0078812 A1 | 4/2005 | Batni et al. |
| 2005/0094796 A1 | 5/2005 | Beauford |
| 2005/0096006 A1 | 5/2005 | Chen et al. |
| 2005/0190789 A1 | 9/2005 | Salkini et al. |
| 2005/0201382 A1 | 9/2005 | Xue et al. |
| 2005/0281208 A1 | 12/2005 | Dorenbosch et al. |
| 2006/0030357 A1 | 2/2006 | McConnell et al. |
| 2006/0077956 A1 | 4/2006 | Saksena et al. |
| 2006/0077957 A1 | 4/2006 | Reddy et al. |
| 2006/0092925 A1 | 5/2006 | Svensson et al. |
| 2006/0104431 A1 * | 5/2006 | Emery et al. ............. 379/211.04 |
| 2006/0136560 A1 | 6/2006 | Jiang |
| 2006/0165059 A1 | 7/2006 | Batni et al. |
| 2006/0211423 A1 | 9/2006 | Ejzak et al. |
| 2006/0221943 A1 | 10/2006 | Aborn et al. |
| 2006/0229078 A1 * | 10/2006 | Itzkovitz et al. ............. 455/445 |
| 2007/0041533 A1 | 2/2007 | Rudolph |
| 2007/0070976 A1 | 3/2007 | Mussman et al. |
| 2007/0142028 A1 | 6/2007 | Ayoub et al. |
| 2007/0206563 A1 | 9/2007 | Silver et al. |
| 2008/0137646 A1 | 6/2008 | Agarwal et al. |

* cited by examiner wireless communication network environment 10 with IP core

MSCe 28 retrieve call features signal sequence ringing management signal sequence session progress
signal sequence multiple-termination call delivery 300 retrieve call features
signal sequence ringing management signal sequence session progress
signal sequence release remainder of initiated call setup

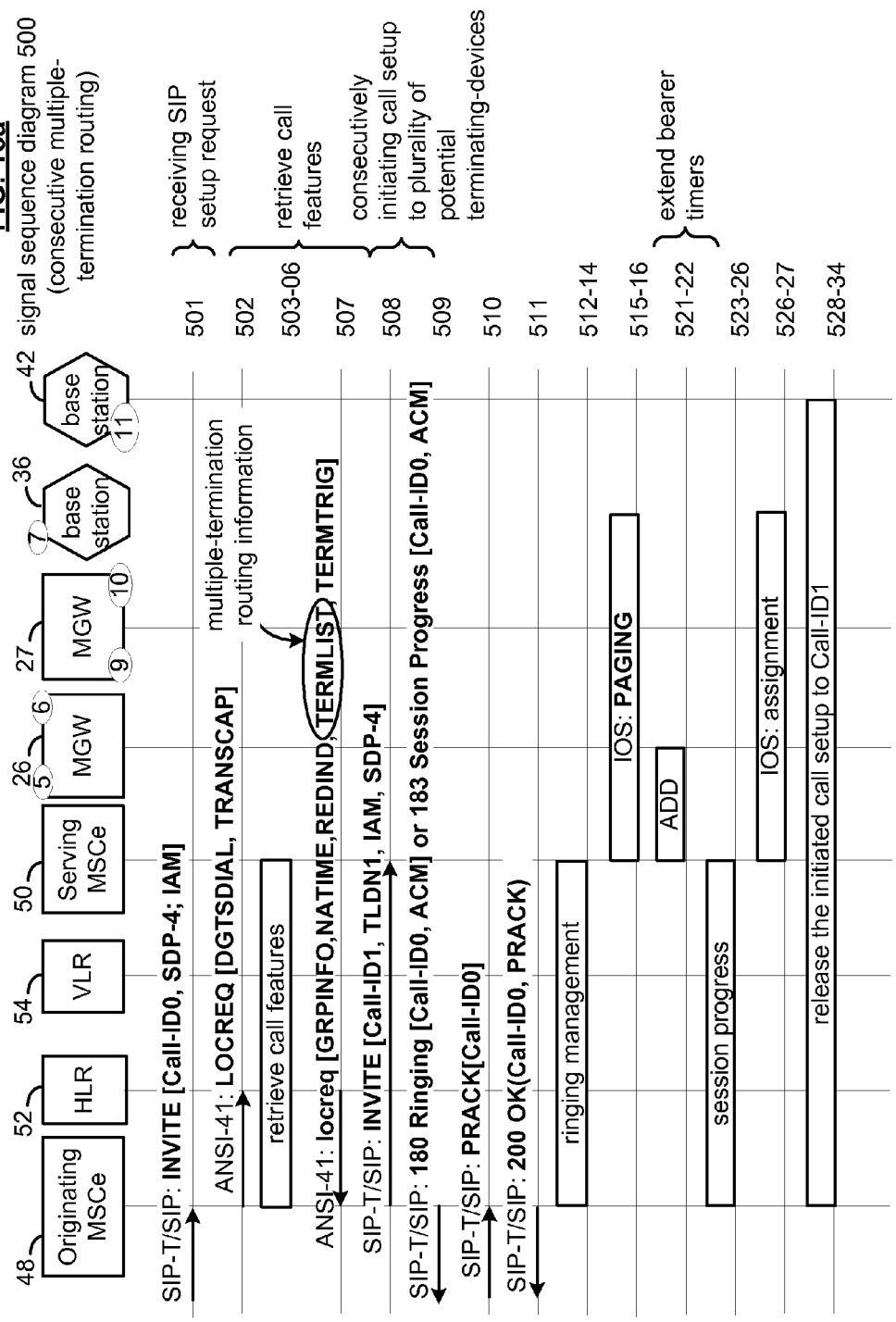

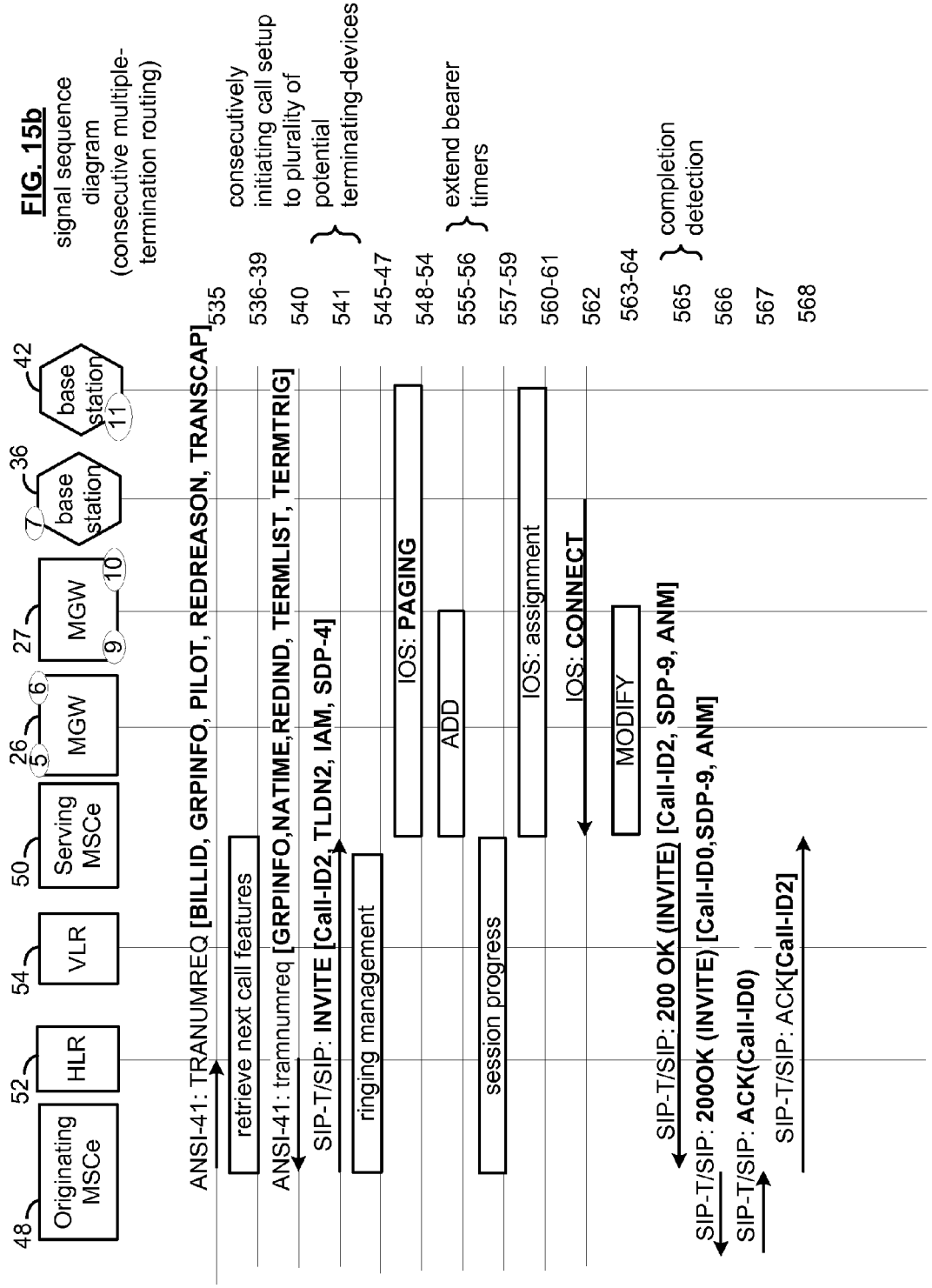

retrieve call features
signal sequence ringing management signal sequence session progress signal sequence release call setup retrieve next call features
signal sequence ringing management signal sequence session progress signal sequence

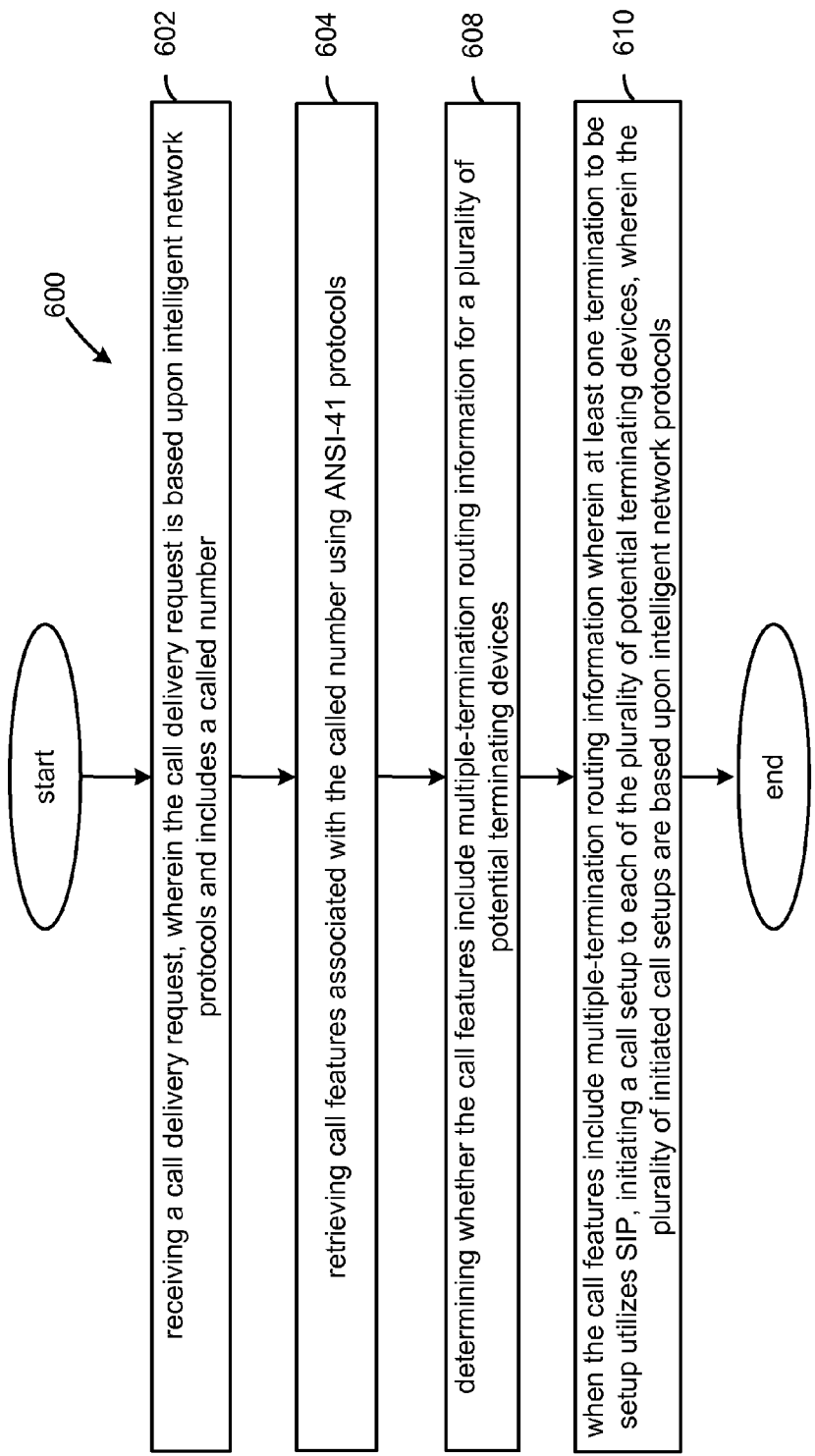

MULTIPLE-TERMINATION ROUTING IN A WIRELESS NETWORK ENVIRONMENT WITH AN INTERNET PROTOCOL CORE

CROSS-REFERENCE TO RELATED APPLICATIONS

This invention is a continuation application of U.S. patent application Ser. No. 11/352,757, entitled "Multiple-Termination Routing in a Wireless Network Environment with an Internet Protocol Core", filed Feb. 13, 2006 now U.S. Pat. No. 8,208,413, which claims priority pursuant to 35 U.S.C. §119 (e) to U.S. Provisional Application Ser. No. 60/652,561, filed Feb. 14, 2005, and to U.S. Provisional Application Ser. No. 60/661,163, filed Mar. 11, 2005. U.S. patent application Ser. No. 11/352,757, U.S. Provisional Application Ser. No. 60/652,561, and U.S. Provisional Application Ser. No. 60/661,163 are all hereby incorporated by reference in their entirety as though fully and completely set forth herein.

BACKGROUND

1. Technical Field

The present invention relates generally to cellular wireless communication networks; and more particularly to mobile station operation in a legacy mobile station domain communication network.

2. Related Art

Cellular wireless networks include a "network infrastructure" that facilitates wireless communications with mobile terminals operating within a particular service coverage area. The network infrastructure couples to other network elements to support numerous types of communications, for example, the Public Switched Telephone Network (PSTN), the Internet, et cetera. The network infrastructure may route communications to other subscribing wireless units, to terminals coupled to the PSTN, to terminals coupled to the Internet, or to terminals coupled via another network to one of these networks.

Various wireless interface specifications have been developed to standardize wireless communications between the mobile terminals and the network infrastructure and between components that comprise the network infrastructure. Wireless interface specifications include, for example, the Advanced Mobile Phone Service (AMPS) specifications, the Global System for Mobile communications (GSM) specifications, the Code Division Multiple Access (CDMA) specifications, and the Time Division Multiple Access (TDMA) specifications. Generations of these specifications are generally referred to as first generation (1G), second generation (2G), third generation (3G), fourth generation (4G), et cetera. Each advancing generation of standards typically performs and/or supports a greater number of services, a greater number of features, and provides better communication qualities. These operating specifications may also be partially deployed from generation to generation, for example, 2G to 2.5G.

Some partial generation wireless specification updates may be deployed using a legacy infrastructure. For example, a 2.5G network has been deployed using upgraded components of a 2G network. When moving from one generation to another generation, however, the network infrastructure must typically be rebuilt using new infrastructure components.

Network infrastructure replacement is both expensive and difficult to deploy. An additional problem resulting from the generational replacement relates to backward compatibility of subscriber services. With 3G networks, for example, a subscriber subscribes to 3G services, which includes a suite of services. A 3G subscription may include, for example, circuit switched voice services for the subscriber's 2G mobile terminal, packet switched voice service for the subscriber's 3G packet switched mobile terminal, packet data services for the subscriber's personal data assistant, and packet data services for the subscriber's notebook computer, among other services. Each of the subscriber's wireless devices, however, may not be compatible with the 3G infrastructures.

In a typical next generation 3G infrastructure, legacy terminal support will be provided. When 3G systems are deployed, 3G mobile terminals will be placed into service. In such cases, the 3G infrastructures will support the 3G services for the 3G mobile terminals as they operate within the respective service areas. The 3G mobile terminals, however, must also be serviced while roaming into legacy 2G wireless networks. Thus backward compatibility issues arise that have not heretofore been addressed.

Further, 3G wireless terminals may be placed in service within a legacy network, and thus will be limited in their operation to certain services. If such a 3G wireless device roams from its home service area (that is, the area for which the subscriber normally obtains service) into a visiting service area that supports all 3G packet switched services, the 3G wireless device should not be allowed to receive services to which it does not subscribe. In such case, the visited network must prevent delivery of these services.

Thus, there is a need in the art for a system and method that may be employed to support services for both legacy mobile terminals and next generation mobile terminals operating within a next generation wireless communication systems and further to support services for next generation terminals operating within next generation networks for which the subscriber has subscribed to legacy networks based services.

SUMMARY

Provided is multiple-termination routing in a wireless network environment that includes an Internet Protocol ("IP") core, where a call delivery request is received. The call delivery request is based upon intelligent network protocols and includes a called number. The call features associated with the called number are retrieved, and a determination is made whether the call features include multiple-termination routing information for a plurality of potential terminating devices. When the call features include multiple-termination routing information wherein at least one termination to be routed utilizes Session Initiation Protocol ("SIP"), independent call setups are initiated, concurrently or consecutively, to each of the plurality of potential terminating devices.

In a further aspect, when the call delivery request is a SIP INVITE, responding to the received call delivery request with a ringback message, wherein the ringback message instructs the sender of the call delivery request to generate ringback to the calling party terminating device.

In another aspect, the call setups are initiated consecutively to each of the plurality of potential terminating devices. A call setup leg is extended to the consecutively initiated call setups in response to a received provisional response, wherein the received provisional response provides call station information to be used for establishing a bearer path. Upon detecting a first potential terminating device to complete the call setup, initiation of a subsequent call setup (or setups) to the remaining terminating devices is foregone.

In yet another aspect, the call setup is concurrently initiated to each of the plurality of potential terminating devices concurrently initiating. A call setup leg is extended to each of the concurrently initiated call setups in response to a received provisional response, wherein the received provisional response provides call station information that is to be used for establishing a bearer path. Upon detecting a first potential terminating device to complete the call setup, the call setup is released to any of the remaining potential terminating devices.

BRIEF DESCRIPTION OF THE DRAWINGS

FIGS. 15a and 15b are a signal flow diagram illustrating call delivery for consecutive multiple-termination routing according to an embodiment of the invention;

FIG. 16 is a signal flow diagram illustrating the retrieve call features signal sequence of FIG. 15a;

FIG. 17 is a signal flow diagram illustrating the ringing management signal sequence of FIG. 15a;

FIG. 18 is a signal flow diagram illustrating the detailed session progress signal sequence of FIG. 15a;

FIG. 19 is a signal sequence illustrating releasing the call setup of a potential terminating device of FIG. 15a;

FIG. 23 is a flow chart of a method for call delivery for consecutive multiple-termination routing according to an embodiment of the invention.

DETAILED DESCRIPTION OF THE DRAWINGS

Figure 1:
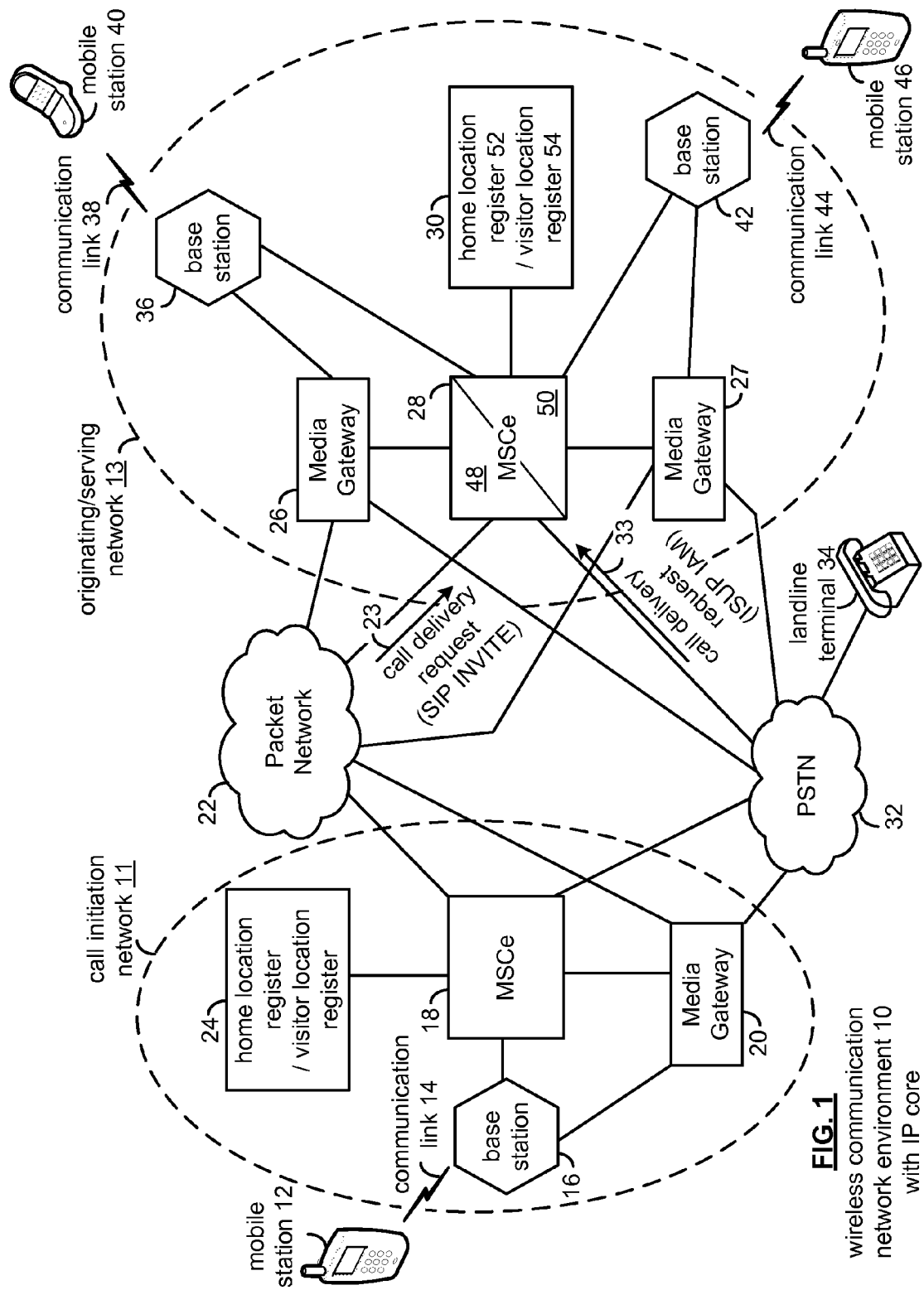
FIG. 1 is a functional block diagram of a communication network formed according to an embodiment of the invention.

FIG. 1 is a functional block diagram of a communication network formed according to an embodiment of the invention. The wireless communication network environment 10 is a next generational network that includes known components that, in addition to legacy network protocols (such as Integrated Services Digital Network User Part ("ISUP"), the call control portion of Signaling System 7), also utilizes the Internet Protocol ("IP") as a network transport and IP-based call control protocols (for example, the Session Initiation Protocol ("SIP")). The wireless communication network environment 10 may be employed to support both legacy mobile terminals and next generation mobile terminals within next generation wireless communication systems and further to properly service next generation terminals within next generation networks that have subscribed legacy networks services deploying legacy protocols in combination with IP-based signaling protocols that create additional complexity and processing obstacles to provide features that were taken for granted in legacy networks.

The communications network 10 includes a code division multiple access ("CDMA") wireless access link that can use SIP and Internet Protocol ("IP") for call origination and termination operations. An example of such a network is a Legacy Mobile Station Domain ("LMSD"). As one of ordinary in the skill would appreciate, other mobile wireless networks may be deployed. The wireless communications network is accessed with respect to the placement of a call to a mobile subscriber or by the initiation of a call by the mobile subscriber, and may be implemented by a variety of devices, such as a computer-based device, another mobile station, and/or a landline terminal.

Though a communications network may be modified and/or evolved to accommodate newer features, such as the multimedia data communications, support for maintaining legacy network features is also desired. For example, one such feature is multiple-termination routing, which allows a subscriber to be contacted simultaneously at multiple phone numbers, including home and office phones, mobile phones, and/or pagers, that are arranged and/or sequenced in a member list which contains information as to initiating concurrent and/or consecutive call setups with respect to the devices. Callers reach the subscriber by dialing a single called number. The call setup is completed on the first phone that answers, whether in a concurrent fashion that causes all of the members in the member list to be alerted, in a consecutive fashion where the members are successively alerted until a call is completed on the first phone that answers, and/or a mixture of concurrent and consecutive alerting. Completion of the call setup may occur through a subscriber answering the alerting terminal, through the alerting terminal entering a voice mail mode of operation, through a no-answer basis that allows the subscriber to determine how they want "no answer" calls to be handled, for example, forwarded to voice mail, et cetera.

The wireless communications network environment 10 includes a call initiation network 11, a packet network 22, a public switched telephone network ("PSTN") 32, and an originating/serving network 13. The call initiation network supports calls initiated by the mobile station 12 and originating/serving network 13, supports the call terminating devices, mobile stations 40 and 46. The call initiation network 11 includes a mobile switching center emulation ("MSCe") 18, a home location register/visitor location register 24, a base station 16, media gateway ("MGW") 20 and a mobile station 12. The originating/serving network 13 includes MGW 26, base stations 36 and 42, an MSCe 28, a HLR/VLR 30, and mobile stations 40 and 46.

The call initiation network 11 and the originating serving network 13 interwork with other networks that include a packet network 22 and a public switched telephone network ("PSTN") 32 which is coupled to a landline terminal 34. The packet network 22 and the PSTN 32 provide access to other networks and/or termination devices beyond those illustrated in the example provided.

The packet network 22 is a data network where data, arranged in a packet form, is routed between nodes over data links that may be shared between the nodes. An example of a packet network 22 include the Public Internet (which uses Internet Protocol ("IP") based communications), Asynchronous Transfer Mode ("ATM") based networks, et cetera.

The PSTN 32 is a network based upon circuit switching methodologies where dedicated connections between nodes are established for the duration of a communication dialog, such as with the local, long distance, and international phone systems. The PSTN uses intelligent network protocols for call delivery, such as the Signaling System No. 7 ("SS #7"). Intelligent networking is a method for providing and interpreting information within a distributed network. The North American variant of this protocol is referred to as "SS7" (without the "#"). The SS7 protocol employs a dedicated data circuit to carry packetized machine language messages about each call connected between and among machines of a network to achieve connection control. Intelligent network applications are built upon this protocol, and include call control and transaction capabilities that support database access as well as a variety of intelligent network functions and wireless telecommunications services.

With respect to wireless mobile communications networks (such as those under the TIA-136 and TIA-2000 specifications) utilize ANSI-41 as a signaling protocol that provides transaction-based operations to support subscriber mobility in the wireless telecommunications network. In the call initiation network 11, the base station 16, the MSC 18, MGW 20, and the HLR/VLR 24 provide subscriber mobility services to the mobile station 12. ANSI-41 allows a subscriber to move between networks while a call is in progress, allows subscribers to originate calls while roaming (that is, operating their mobile devices in a system other than the home system where the subscription was established), allows subscribers to receive calls while roaming, and allows subscribers to activate and use supplementary call features while roaming (for example, call forwarding).

A mobile station 12 is coupled to the call initiation network 11 through a base station 16 by the communication link 14. Communication link 14 is a wireless link. The base station 16 includes a base station controller and a base station transceiver (that is, radio receiver and transmitter) to provide the communication link 14. The base station 16 is further coupled to a mobile switching center emulation (MSCe) 18. The MSCe 18 provides the signaling functionality equivalent to that defined for a legacy MSC (that is, a 3GPP2 call control entity that only supports circuit-switched operations). Part of the signaling functionality supported by MSCe 18 includes the establishment, maintenance and termination of voice calls, the ability to modify an established call (for example, establishing three-way call after establishing a two-way call), and triggers to other network elements for the support of subscriber specific features (for example, prepaid calling). The MSCe 18 is coupled to the packet network 22 and the PSTN 32. The packet network 22 provides signaling connectivity (such as SIP connectivity) to other mobile communications networks, such as a LMSD network. The PSTN 32 provides signaling connectivity to landline devices, such as the landline terminal 34. The MGW 20 is coupled to base station 16, the packet network 22 and the PSTN 32.

The MGW 20 provides the bearer functionality for voice calls in the call initiation network 11. An example of bearer functionality includes the conversion of a voice data format, such as enhanced variable rate codec ("EVRC"), into another voice data format, such as ITU-T (International Telecommunication Union-Telecommunication Standardization Sector) G.711. Such voice data formats are used when a voice call is established between the mobile station 12 through the base station 16, and the landline terminal 34 through the PSTN 32. Also, the MGW 20 supports the bearer traffic connectivity (for example, IP connectivity) to other mobile station communication networks, such as a LMSD, though packet network 22, and to landline devices through PSTN 32. The MGW 20 is also coupled to MSCe 18, which controls the bearer resources of MGW 20 through signaling (for example, the MEdia GAteway COntrol protocol ("MEGACO") or the ITU-T recommendation for MEGACO, which is H.248). Generally, under MEGACO, the commands apply to terminations that are related to a "context." A termination sources and/or sinks one or more streams of information. A context is an association between a collection of Terminations. The context describes the topology (that is who hear/sees whom) and the media mixing and/or switching parameters for the cases where more than two terminations are involved with this association Contexts are modified using the Add, Subtract, and Modify commands of H.248, with a connection created when two or more terminations are placed in a common context. The MSCe 18 retrieves subscriber and location information for the mobile stations it presently serves from the HLR/VLR 24.

With respect to the originating/serving network 13, the mobile station 40 communicates over a communication link 38 with a base station 36, and the mobile station 46 communicates over a communication link 44 to the base station 42. The base station 36 and the base station 42 access the MSCe 28 for supporting subscriber services. The MSCe 28 accesses the HLR/VLR 30 for subscriber and location information to mobiles stations it presently serves, such as mobile station 40 and mobile station 46. Though the MSCe 28 includes an Originating MSCe 48 and a Serving MSCe 50, the originating and serving components of the MSCe may exist as separate units. The multiple-termination routing operation and function of the Originating MSCe 48 will be described in detail with reference to FIGS. 3 through 23.

The MSCe 28 provides the signaling functionality to support subscriber services (for example, the delivery of a voice call to the mobile station 40). The MSCe 28 is coupled to the packet network 22 and the PSTN 32. For signaling connectivity (for example, SIP connectivity) to other mobile station communications networks, such as a LMSD, the packet network 22 is utilized. The PSTN 32 provides signaling connectivity (for example, Integrated Services Digital Network User Part ("ISUP") connectivity) to landline devices, such as the landline terminal 34.

The MGW 26 provides the bearer functionality for voice calls in the originating/serving network 13. The MGW 26 is coupled to base station 36, the packet network 22 and the PSTN 32. The MGW 26 supports the bearer traffic connectivity (for example, IP connectivity) to other mobile station networks, such as a LMSD network, though the packet network 22 and to landline devices through the PSTN 32. The MGW 26 is also coupled to the MSCe 28, which controls the bearer resources of MGW 27 through signaling protocols (for example, MEGACO and/or H.248).

The MGW 27 also provides the bearer functionality for voice calls in the originating/serving network 13. The MGW 27 is coupled to base station 42, the packet network 22 and the PSTN 32. The MGW 27 supports the bearer traffic connectivity (for example, IP connectivity) to other mobile station networks, such as a LMSD network, though the packet network 22 and to landline devices through the PSTN 32. The MGW 27 is also coupled to the MSCe 28, which controls the bearer resources of MGW 27 through signaling protocols (for example, MEGACO and/or H.248).

In operation, when the mobile station 12 initiates a call to the mobile station 40 via its called number, the network 10 engages in the necessary signaling for termination routing to the mobile station 40. In the case where a multiple-termination routing is not present (that is, a one-to-many termination routing) the MSCe 18 configures the bearer resources in MGW 20, the base station 16, and mobile station 12 based upon information returned by MSCe 28.

With the wireless communication network environment 10, utilizing IP-based signaling protocols (for example, SIP) in combination with legacy network signaling protocols such as ANSI-41, additional complexity and processing exists to provide features otherwise taken for granted in legacy networks limited to deploying legacy signaling protocols such as ISUP and/or ANSI-41. The provisioning of multiple-termination routing involves accommodating the various subscriber services associated with a unique subscriber identifier (such as the Directory Number, the Mobile Identification Number, the Equipment Serial Number, etc.).

For example, for multiple-termination routing, if the called number placed by the mobile station 12 is associated with the mobile station 40, a multiple-termination routing feature may be present with respect to the call being completed with not only alerts mobile station 40 that a call from mobile station 12 is being attempted, but also alerts mobile station 46 and the landline terminal 34. The Originating MSCe 48 accommodates multiple-termination routing for the originating/serving network 13. In general, upon receiving a call delivery request 23 for a called number from the packet network 22 and/or a call delivery request 33 from the PSTN 32, the Originating MSCe 48 has the capability to access the subscriber feature subscription using the home location register 52 and the visitor location register 54 for call features associated with the called number in the call delivery request. The call features may include multiple-termination routing information as part of the subscriber feature subscription. When the call features include multiple-termination routing information, the MSCe 28 has the capability to initiate the multiple independent call setups to provide this subscriber feature accordingly.

Figure 2:
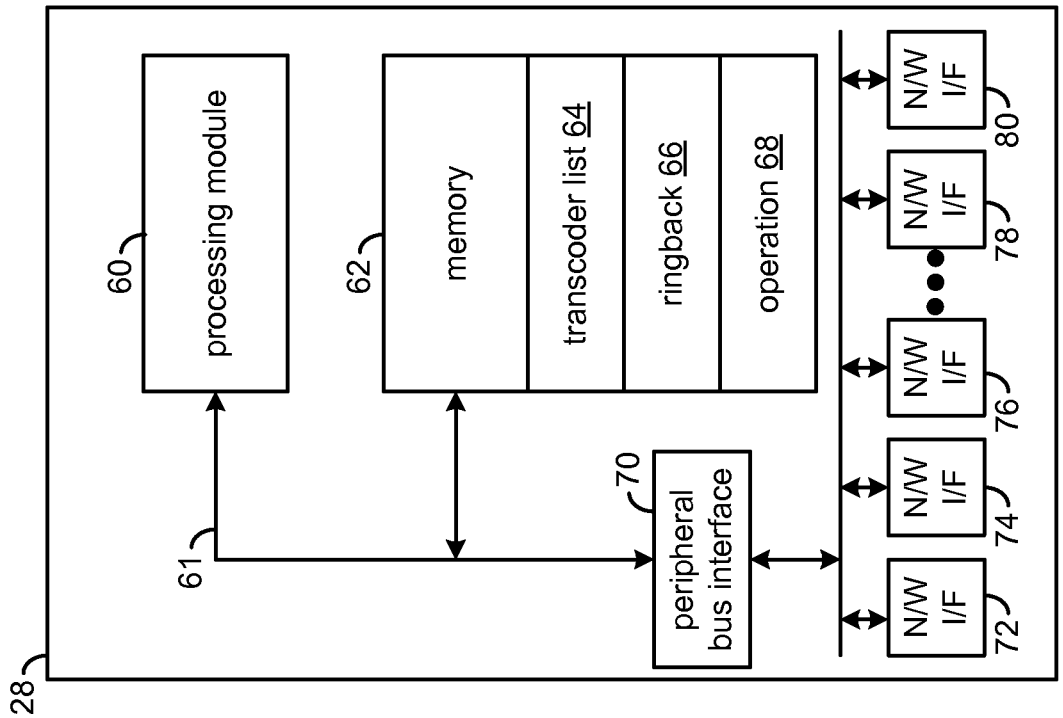
FIG. 2 is a functional block diagram of an MSCe according to an embodiment of the invention.

FIG. 2 is a functional block diagram of the MSCe 28 that includes a processing module 60, a memory 62, a peripheral bus interface 70, and network interfaces 72 through 80. The processing module 60, in combination with operational instructions stored in memory 62 and accessed via the bus 61, executes MSCe functions. The MSCe functions include, but are not limited to, basic switching functions, call establishment coordination to and from wireless subscribers, transmission facilities management, mobility management, and/or call processing functions. The MSCe 28 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 62 may be a single memory device or a plurality of memory devices. Such a memory device may be a read-only memory, random access memory, volatile memory, non-volatile memory, static memory, dynamic memory, flash memory, and/or any device that stores digital information.

The memory 62 can include a transcoder list 64, ringback logic 66, and operation logic 68. The operation logic includes logic for communicating through at least one network interface utilizing standardized protocols. The MSCe 28 includes a plurality of network ports labeled as network I/Fs (interfaces) 72-80. For intercommunication, the MSCe 28 receives a list of transcoders from a mobile station through one of the network interfaces 72-80, and the MSCe 28 forwards the list of transcoders through the network 10 through another interface of the network interface 72-80. The MSCe 28 also determines whether to generate a ringback or whether to allow another MSCe (such as MSCe 18) to generate ringback to the calling party. In the described embodiment, MSCe 28 includes operational logic that enables it to act as an Originating MSCe 48, and/or a terminating (serving) MSCe 50.

Figure 3:
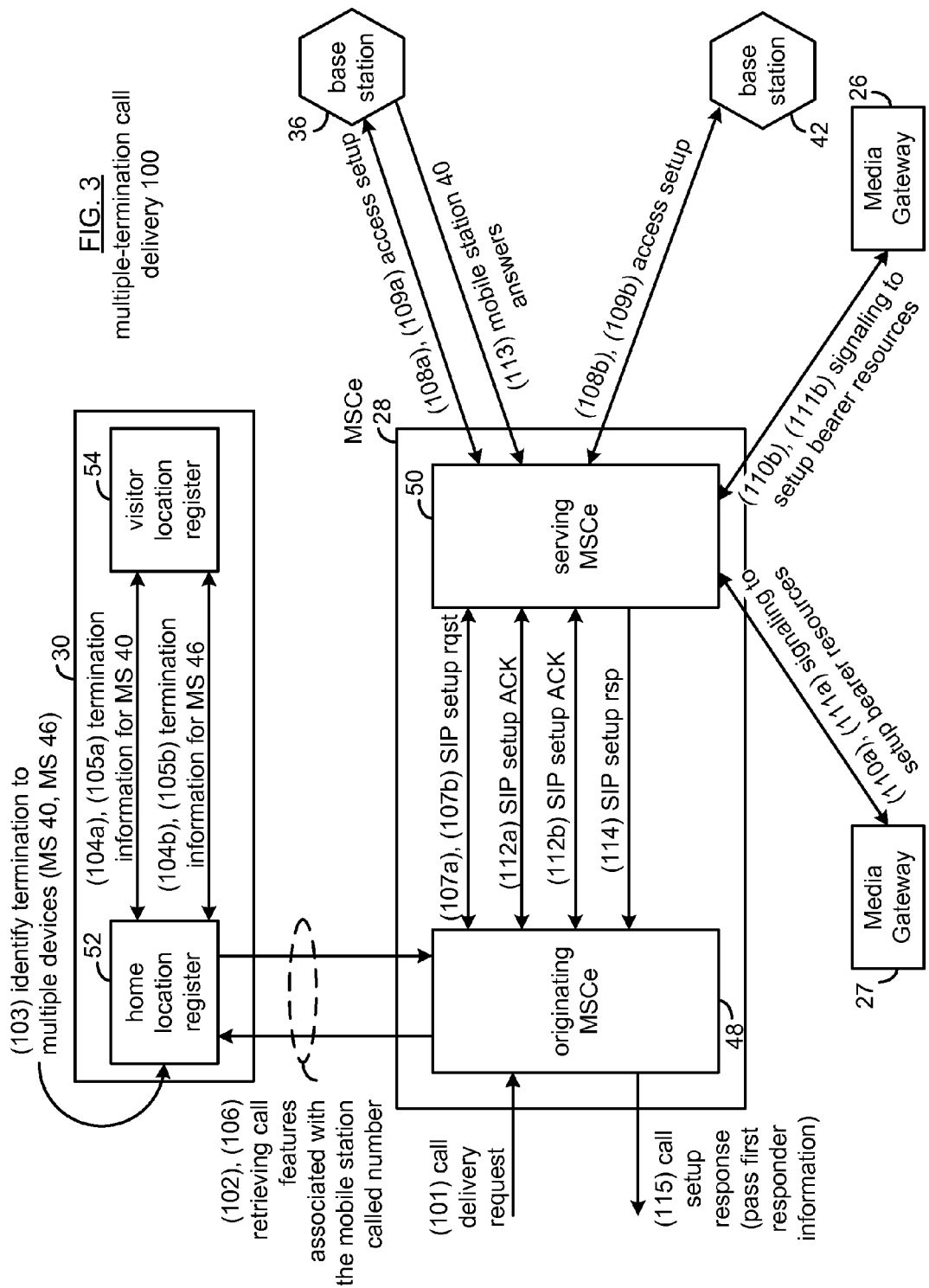
FIG. 3 is a functional block diagram of a multiple-termination call delivery to mobile stations according to an embodiment of the invention.

FIG. 3 is a functional block diagram of a multiple-termination call delivery 100 to mobile stations serviced by the base station 36 and the base station 42. The multiple-termination call delivery 100 includes an MSCe 28, a HLR/VLR 30, media gateways 26 and 27, and base station 36 that services mobile station 40, and base station 42 that services mobile station 46. The MSCe 28 includes a Serving MSCe 50 and an Originating MSCe 48. The Originating MSCe 48 provides the multiple-termination call delivery capability.

The HLR/VLR 30 includes a home location register 52 and a visitor location register 54. The HLR 52 and the VLR 54 may be located with each other, or as separate network elements. The home location register 52 is the location register to which a user identity is assigned for record purposes such as subscriber information. Subscriber information includes items such as location information, subscriber status, subscribed features, and directory numbers. An HLR may serve one or more MSCs and/or MSCes The visitor location register 54 is the location register other than the HLR used by an MSC or MSCe to retrieve subscriber information for handling of services for a visiting subscriber. A service provider populates a visitor location register 54 initially, and is subsequently populated with visiting subscribers as they roam into, and out of, the coverage area served by the visitor location register 54. A visiting subscriber is a subscriber having services provided by a network outside of it home service area. The visitor location register 54 may serve one or more MSCs and/or MSCes.

The MSCe 28, in the present example, has an Originating MSCe 48 and a Serving MSCe 50. The "emulator" designation for the MSCe indicates the packet implementation of an MSC, though bearer data is not "switched" in the sense of a conventional MSC. The Originating MSCe 48 and the Serving MSCe 50 may be present in the same MSCe 28 or in a separate MSCe across a network. For simplicity of example, the originating and the Serving MSCe 50 are shown as being present in the MSCe 28. When a mobile station becomes operational within an area serviced by the MSCe 28, the visitor location register 54 temporarily stores subscriber information obtained from the home location register 52 that relates to the mobile station. The Serving MSCe 50 uses this subscriber information to provide services to the mobile station while it operates within the service coverage area of Serving MSCe 50.

In operation, a call delivery request 101, which includes a called number, is provided to the Originating MSCe 48. The Originating MSCe 48 may receive the call delivery request 101 from the packet network 22 (for example, the call delivery request 23 is a SIP INVITE request), or from the PSTN 32 (for example, the call delivery request 33 is an ISUP Initial Address Message ("IAM")). In response to the call delivery request, the Originating MSCe 48 makes a request 102 to HLR/VLR 30 to obtain any call features associated with the called number and information as to how the Originating MSCe 48 should respond to the call setup request. The call features may include multiple-termination routing information. This information includes a member list and termination triggers. The member list provides a list of potential terminating devices, and may also designate the termination sequence for initiating the call sequence. The call sequence may be for consecutive call setups, concurrent call setups to each of the members, and/or a mixture thereof. In the present example, the members include mobile station 40 and mobile station 46, and the member list provides for concurrent, and/or consecutive, call setups to the terminating devices. Consecutive call setups are described in detail with reference to FIGS. 15 through 22. Based upon its subscriber information (for example location information), the home location register 52 retrieves termination information for the mobile station 40 at 104*a* and 105*a*, and for the mobile station 46 at 104*b* and 105*b* via the visitor location register 54. The HLR/VLR 30 returns call features associated with the called number in response 106.

Having retrieved the call features, the Originating MSCe 48 determines whether the call features include multiple-termination routing information to a plurality of potential terminating devices. Such determination, for example, is the presence of a TERMLIST parameter from an ANSI-41 location request response ("locreq"). When the call features include multiple-termination routing information, the Originating MSCe 48 initiates a call setup to each of the potential terminating devices. Using the routing information, the Originating MSCe can determine whether the terminating device is being served by another MSCe. When the terminating device is being served by an MSCe, the Originating MSCe 48 uses SIP for the call control protocol. In the present example both mobile station 40 and mobile station 46 are being served by the MSCe 48. Based upon the TERMLIST information, that is concurrent call setups, the Originating MSCe sends a SIP setup request at 107*a* and at 107*b* to the Serving MSCe 50.

Based upon internal information received while mobile station 40 and mobile station 46 are operating within the service area of the Serving MSCe 50, the Serving MSCe 50 attempts to contact the mobiles. The Serving MSCe 50 initiates an access setup to the base station 36 at 108*a* and to the base station 42 at 108*b*. After mobile 40 responses base station 36 send 109*a* to the Serving MSCe 50. After mobile station 46 responses base station 42 sends 109*b* to the Serving MSCe 50. In preparation for the call path with any of the mobile stations, the Serving MSCe 50 sends a signaling message 110*a*, for example a H.248 ADD command, to the media gateway 27 to setup bearer resources to support a call setup to mobile station 46. The media gateway acknowledges the bearer resource setup with signaling message 111*a* sent to the Serving MSCe 50. The Serving MSCe sends a signaling message 110*b*, for example a H.248 ADD command, to the media gateway 26 to setup bearer resources to support a call setup to mobile station 40. The media gateway acknowledges the bearer resource setup with signaling message 111*b* sent to the Serving MSCe 50.

The call setup status for each of the potential terminating devices, mobile station 42 and mobile station 46, is provided to the Originating MSCe 48 via the SIP setup ACK 112*a* and 112*b*. In this instance, the call setup is completed by the mobile station 40, as in having been "answered." The base station 36 informs the Serving MSCe 50 by sending 113. In response to 113, SIP setup response 114 is sent to Originating MSCe. The Originating MSCe 48 completes the call setup by sending the call setup response 115 containing information about the first responder, mobile station 40. The Originating MSCe 48 releases the remaining potential terminating device, mobile station 46, and any bearer resources allocated to the call setup to mobile station 46.

Figure 4:
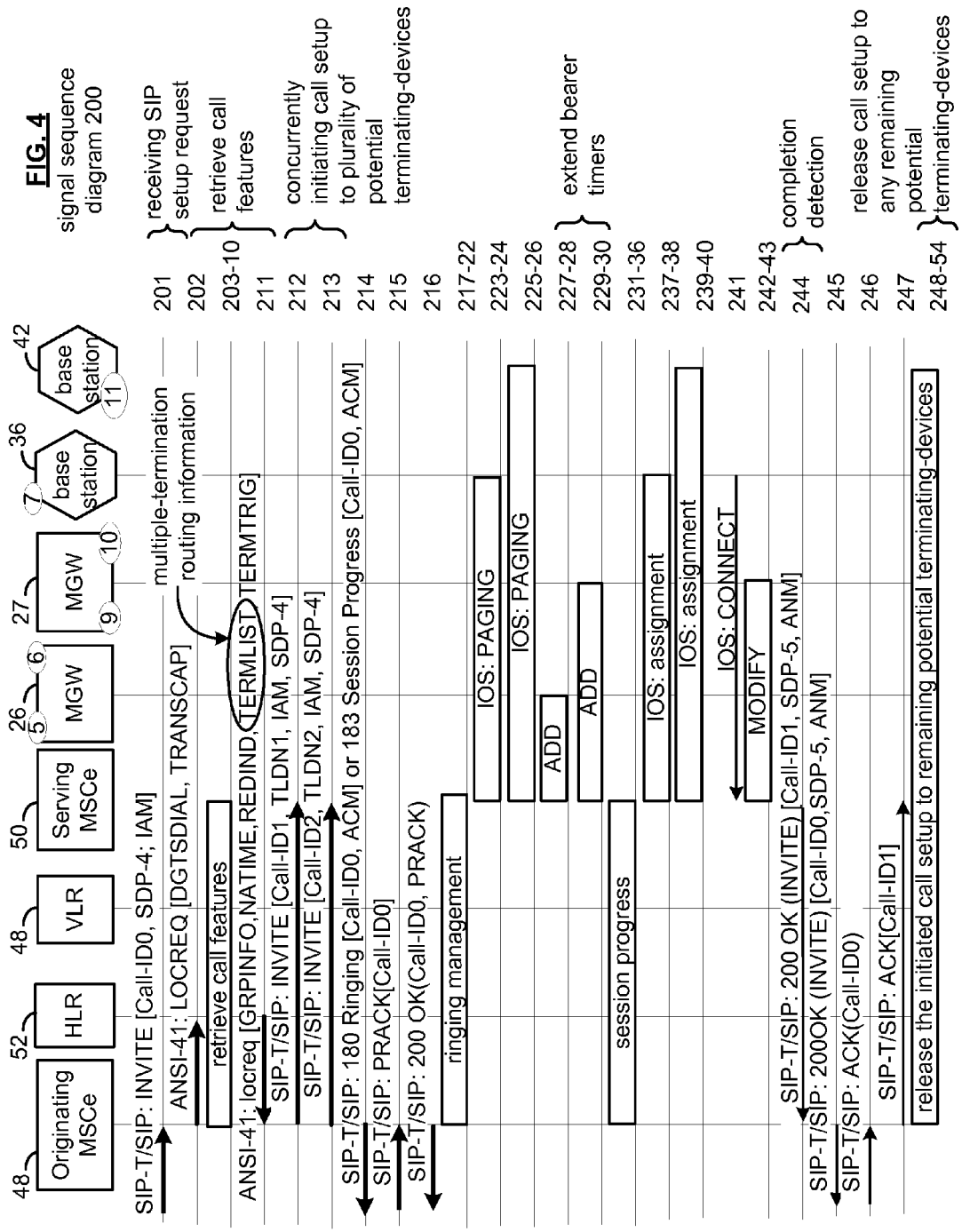
FIG. 4 is a signal flow diagram illustrating call delivery for concurrent multiple-termination routing according to one embodiment of the present invention.

FIG. 4 is a signal flow diagram 200 illustrating call delivery for concurrent multiple-termination routing via the base station 36 and the base station 42. Although the signal flow diagram 200 illustrates a concurrent multiple-termination routing for two mobile stations, one of ordinary skill in the art would appreciate that additional multiple-terminations may be used.

The SIP protocol is an IP based call control protocol set out by the Internet Engineering Task Force ("IETF") Request-For-Comment ("RFC") 3261. SIP-T is set out by IETF RFC 3372 regarding encapsulating ISUP messages (for example, as defined by ITU-T Q.763 or Alliance for Telecommunications Industry Solutions PP-1000113.2005) within SIP. ISUP messaging is used as circuit-switched (for example a SS7 based network) call control protocol. ISUP messaging is used to set-up, manage, and release trunk circuits that carry voice and data calls over a PSTN. The SIP-T/SIP convention is used to denote that a SIP message may include an encapsulated ISUP message. SIP-T/SIP messages may also include a payload. An example of a SIP payload is an SDP (Session Description Protocol) message. A SDP message, is a short structured textual description of the name and purpose of the session, and the media, protocols, codec (code/decode) formats, timing and transport information that are required to decide whether a session is likely to be of interest and to know how to start media tools to participate in the session. The information within a SDP message is set out in IETF RFC 2327.

For ANSI-41 commands, the ANSI-41 convention for operation component acronyms is used. For example, the Invoke component acronym is in all-capital letters (for example, "LOCREQ"), while the return result component acronym is in all-lowercase letters (for example, "locreq"). Also, IP terminals at the media gateways and the base stations are illustrated as numbers inside small ovals. The terminals are numbered for so that the various call segments may be more easily referenced. The description of FIGS. 4 through 8 and 10 through 23 is organized according to the particular events identified by corresponding numerical identifiers:

201 The Originating MSCe 48 receives an INVITE (per RFC 3261) message that includes a SDP message, labeled SDP-4, and a called number. The INVITE may include an encapsulated Initial Address Message ("IAM"). The Originating MSCe 48 is the MSCe that owns the called number dialed by the calling party (for example, mobile station 12).

202. The Originating MSCe 48 sends a LOCREQ to the home location register 52 associated with called number. The Originating MSCe 48 may optionally include a TransactionCapability parameter to specify the appropriate termination handling.

203-10 The call features associated with the called number are retrieved via the home location register 52. Retrieval of the call features will be discussed in detail with reference to FIG. 5.

211 When all routreqs are received by the home location register 52, it returns a locreq to the Originating MSCe 48. The locreq includes multiple-termination routing information in the form of the TerminationList ("TERMLIST") parameter, along with an indication of the reason for extending the incoming call (that is, for multiple-termination routing) in the DMH_RedirectionIndicator ("REDIND") parameter. The TerminationList parameter includes a member list providing the plurality of potential terminating devices, and termination triggers that indicates when to request further instructions on call processing relating to each of the devices where call setups are being initiated. In this scenario the TerminationList member list includes two terminations: an intersystem termination for the first member, mobile station 40, and an intersystem termination for the second member, mobile station 46. The information indicates the sequence of call processing instructions to initiate a consecutive sequence of call setups.

Figure 5:
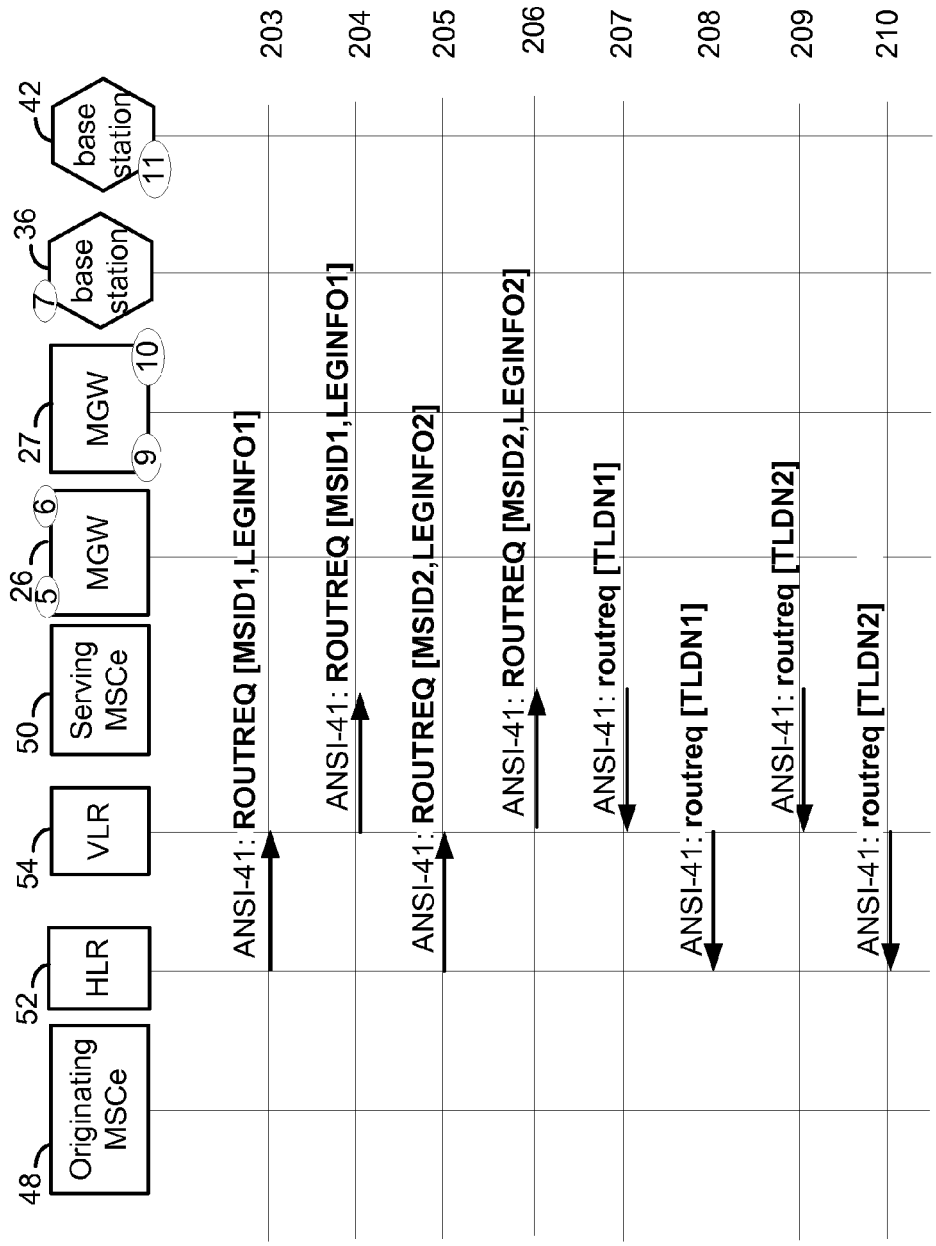
FIG. 5 is a signal flow diagram illustrating the call feature retrieval of signaling steps of FIG. 4.

212 After receiving the locreq in signaling step 211, the Originating MSCe 48 initiates a call setup to each of the plurality of potential terminating devices (that is, mobile station 40 and mobile station 46). Upon analyzing the intersystem termination information the Originating MSCe 48 determines that both of the intersystem terminations are associated with an MSCe and thus SIP-T/SIP will be used for call setups to the MSCe serving the termination-devices. For mobile station 40, the Originating MSCe 48 sends an INVITE message to the Serving MSCe 50 including Call-ID1, TLDN1 ("Temporary Local Directory Number") and SDP-4. The INVITE may include an encapsulated ISUP IAM message. Note that the Originating MSCe 48 may elect to modify SDP-4 as received in Step 201. Note that this INVITE request is for the establishment of a Dialog between the Originating MSCe 48 and the Serving MSCe 50 and is a different Dialog than that related to the INVITE request of signaling step 201 received by the Originating MSCe 48. The dialog between Originating MSCe 48 and the Serving MSCe 50 for a call setup to mobile station 40 is identified by Call-ID1. The Serving MSCe 50 will use TDLN1 to make the association with MSID1 received in the ROUTREQ message (FIG. 5, Step 204).

213 After receiving the locreq at signaling step 211, for initiating a call setup to the mobile station 46, the Originating MSCe 48 sends an INVITE message to the Serving MSCe 50 including Call-ID2, TLDN2 and SDP-4. The INVITE may include an encapsulated ISUP IAM message. Note that the Originating MSCe 48 may elect to modify SDP-4 that was received in signaling step 201. Note that this INVITE request is for the establishment of a Dialog between the Originating MSCe 48 and the Serving MSCe 50 and is a different Dialog than that related to the INVITE request of signaling step 201 received by the Originating MSCe 48. The dialog between Originating MSCe 48 and the Serving MSCe 50 for a call setup to mobile station 46 is identified by Call-ID2. The Serving MSCe 50 will use the TDLN2 to make the association with MSID2 received in response to the ROUTREQ message (see FIG. 5, step 206).

214 After receiving the locreq in signaling step 211, if the INVITE request of signaling step 201 did not include an ISUP IAM Message, the Serving MSCe 50 may send either a 180 Ringing message or a 183 Session Progress message to the originator of the INVITE request of signaling step 201. The SIP informational class of responses "1xx" is used to indicate call setup progress.

When the INVITE request at signaling step 201 includes an ISUP IAM Message the Originating MSCe 48 may send either a 180 Ringing message or a 183 Session Progress message including an ISUP Address Complete ("ACM") message to the originator of the INVITE request of signaling step 201.

If the Originating MSCe 48 elects to initiate local ringback (that is have ringback generated and sent to calling party by the originator of the INVITE request at signaling step 201), then a 180 Ringing message is sent to the originator of the INVITE request of signaling step 201; otherwise a 183 Session Progress message is sent. In this regard, when the call delivery request of signaling step 201 is a SIP INVITE, the Originating MSCe 48 responds to the received call delivery request with a ringback message that instructs the sender of the call delivery request to generate ringback to the calling party terminating device. For a call setup to a single terminating device, the Serving MSCe is serving the terminating device controls all aspects of ringback to the calling party. When multiple-termination routing is performed the control logic within Originating MSCe 48 controls all aspects of ringback to the calling party.

215 In response to the 180 Ringing or 183 Session Progress message, a provisional acknowledgement ("PRACK") message 215, is sent to the Originating MSCe 48. PRACK is used to acknowledge receipt of a SIP provisional response. In some scenarios, like voice calls, it is critical that the network serving the called party known that the call state information within a SIP provisional response has been received by the network serving the calling party. The use of PRACK is set out in IETF RFC 3262.

216 The Originating MSCe 48 sends a 200 OK response to the PRACK message, 215. The 200 OK response stops any retransmissions of the PRACK message.

217-22 The ringing management between the originating MSCe 48 and the Serving MSCe 50 operates to permit sufficient time for the call setups to the potential terminating devices, which in this example are mobile stations 40 and 46. Ringing management 217-22 will be discussed in detail with reference to FIG. 6.

223-24 After receiving the INVITE message of signaling step 212, the Serving MSCe 50 sends a PAGING REQUEST message (under the Interoperability Specification ("IOS") for CDMA2000 access network interfaces) to the base station 36 to initiate a mobile terminated call setup scenario for the mobile station associated with TLDN1 (that is, mobile station 40). The PAGING REQUEST message includes the "Desired Codec" for the mobile station 40. The IOS protocol is used to pass information between an MSCe and a Base Station (BS). The messaging formats and procedures for this protocol are set out in the 3GPP2 A.S0011-C through A.S0017-C, or updates revisions, of these documents.

When the mobile station 40 responds to the page, a PAGING RESPONSE message is sent from the serving base station 36 to the Serving MSCe 50. The PAGING RESPONSE message includes the codec chosen by the mobile station 40. The PAGING RESPONSE message may include a list of available BS transcoders, and the connection information, for example the IP address and port number, for the base station 36 communications channel at termination 7.

225-26 After receiving the INVITE message of signaling step 213, the Serving MSCe 50 sends a PAGING REQUEST message to the base station 42 to initiate a mobile terminated call setup scenario for the mobile station associated with TLDN2 (that is, mobile station 46). The PAGING REQUEST message includes the "Desired Codec" for the mobile station 46.

When a terminating mobile station responds to the page, a PAGING RESPONSE message is sent from the serving base station 42 to the Serving MSCe 50. The PAGING RESPONSE message includes the codec chosen by the terminating mobile station 46. The PAGING RESPONSE message may include a list of available base station transcoders, and the connection information for the base station 42 communications channel at termination 11.

227 With respect to the mobile station 40, the Serving MSCe 50 establishes a context with media gateway ("MGW") 26. The H.248 message sent from the Serving MSCe 50 to MGW 26 includes two ADD commands The first ADD command establishes a termination for a bearer channel using RTP ("Real-time Transport Protocol") towards the packet network 22. The mode is set to sendrecv. If the Serving MSCe 50 elects to initiate Termination-Side ringback (that is, ringback sent to the calling party generated by the network presently serving the called party), then ringback from termination 5 is initiated. The first ADD command includes a SDP-4, which is the remote SDP including the connection information for the bearer entity supporting the calling party (for example MGW 20 supporting a call initiated by mobile station 12). Connection information may include an IP Address and a User Datagram Protocol ("UDP") Port number.

Note that the ringback tone generated by the MGW 26 will not be received by the calling party. As mentioned in step 214 the Originating MSCe 48 controls all aspects of ringback to the calling party for multiple-termination routing scenarios. The bearer entity supporting the calling party will not allow received data to be passed to the calling party until the bearer entity is assured that the data is coming from a trusted source. The Originating MSCe 48 controls the flow of all messaging to the network entities support the calling party. It is only when the Originating MSCe 48 sends a 200 OK (INVITE) including a SDP (with the connection information of the trusted source) that is in response to the SIP INVITE of signaling step 201 will the bearer entity supporting the calling party will allow received bearer data to be passed to the calling party.

The first ADD command may also contain a BT (Bearer Timer) parameter indicating, in seconds, the length of time MGW 26 waits without receiving data from the connection endpoint defined in SDP-4 before applying an error treatment to termination 5 (for example removing termination 5 from the bearer channel using RTP towards the packet network 22 and sending a message to the Serving MSCe 50 informing it of the action). The Serving MSCe 50, from the LEGINFO1 parameter in the Routereq message (signaling step 204), is aware that the call associated with TLDN1 is one termination of a multiple-termination routing scenario. In general the call setup time of a multiple-termination routing scenario is greater than the call setup time of a single termination scenario. The Serving MSCe 50 may, on a per call setup basis, adjust the value of BT based on knowledge it may have about the call setup.

The second ADD command establishes a termination for the base station 36 communication channel with a mode set to sendrecv (a bi-directional connection). The second ADD command includes SDP-7, which is the remote SDP including the base station 36 connection information (that is information sent in signaling step 224 that relates to termination 7).

228 The MGW 20 replies to the H.248 message of signaling step 227 by sending a H.248 Reply message to the Serving MSCe 50. The Reply message includes a SDP-5 and SDP-6. The SDP-5 is the local SDP for the termination given in SDP-4 and includes the MGW 20 connection information for termination 5. The SDP-6 is the local SDP for the termination towards the base station 36 and includes the MGW 26 connection information (for example, the IP address and the UDP Port number) for termination 6.

229 With respect to the mobile station 46, the Serving MSCe 50 establishes a context with the MGW 27. The H.248 message sent from the Serving MSCe 50 to MGW 27 includes two ADD commands. The first ADD command establishes a termination for a bearer channel using RTP towards the packet network 22. The termination mode is set to sendrecv. If the Serving MSCe 50 elects to initiate Termination-Side ringback, then ringback from termination 9 is initiated. The first ADD command includes SDP-4, which is the remote SDP including the connection information for the bearer entity supporting the calling party (for example, the MGW 20 supporting a call initiated by the mobile station 12). Connection information may include an IP Address and a User Datagram Protocol ("UDP") Port number).

Note that the ringback tone generated by the MGW 27 will not be received by the calling party. As mentioned in step 214 the Originating MSCe 48 controls all aspects of ringback to the calling party for multiple-termination routing scenarios. The bearer entity supporting the calling party will not allow received data to be passed to the calling party until the bearer entity is assured that the data is coming from a trusted source. The Originating MSCe 48 controls the flow of all messaging to the network entities that support the calling party. It is only when the Originating MSCe 48 sends a 200 OK (INVITE) including a SDP (with the connection information of the trusted source) that is in response to the SIP INVITE of signaling step 201 will the bearer entity supporting the calling party will allow received bearer data to be passed to the calling party.

The first ADD command may also contain a BT (Bearer Timer) parameter indicating, in seconds, the length of time MGW 26 waits without receiving data from the connection endpoint defined in SDP-4 before applying an error treatment to termination 9 (for example removing termination 9 from the bearer channel using RTP towards the packet network 22 and sending a message to the Serving MSCe 50 informing it of the action). The Serving MSCe 50, from the LEGINFO2 parameter in the Routereq message (signaling step 206), is aware that the call associated with TLDN2 is one termination of a multiple-termination routing scenario. In general the call setup time of a multiple-termination routing scenario is greater than the call setup time of a single termination scenario. The Serving MSCe 50 may, on a per call setup basis, adjust the value of BT based on knowledge it may have about the call setup.

The second ADD command establishes a termination for the base station 42 communication channel with a termination mode set to sendrecv (a bi-directional connection). The second ADD command includes SDP-11, which is the remote SDP including the base station 42 connection information (that is information sent in signaling step 226 that relates to the termination 11 of the base station 42).

230 The MGW replies to the H.248 message of signaling step by sending a H.248 Reply message to the Serving MSCe 50. The Reply message includes SDP-9 and SDP-10. The SDP-9 is the local SDP for the termination given in SDP 4 and includes MGW 27 connection information for the termination 9. The SDP-10 is the local SDP for the termination towards base station 42 and includes the connection information (for example, IP address and UDP Port number) for termination 10.

231-36 The session progress signaling addresses the handshake operation between the Serving MSCe 50 and the Originating MSCe 48. The handshake operation between the Originating MSCe 48 and the Serving MSCe 50 operates to provide connection management for the call setups. The session progress signaling is not forwarded through, as would occur with single termination call setups. The session progress signaling 231-36 will be discussed in detail with reference to FIG. 7.

237 After receiving the Reply message of signaling step 228, the Serving MSCe 50 sends an IOS Assignment Request message to the base station 36 to request assignment of radio resources. The Assignment Request message includes MGW 26 connection information (for termination 6, obtained from signaling step 228), the request of any base station 36 transcoding (if necessary) and the codec assignment for the mobile station associated with TDLN1 (that is, mobile station 40).

238 After receiving an Assignment Request message at signaling step 237, the base station 36 sends the IOS Assignment Complete message to the Serving MSCe 50.

239 After receiving the Reply message at signaling step 230, the Serving MSCe 50 sends an IOS Assignment Request message to the base station 42 to request assignment of radio resources. The Assignment Request message includes the MGW 27 connection information (for termination 10, obtained from signaling step 230), the request of any base station 42 transcoding (if necessary), and the codec assignment for the mobile station associated with TDLN2 (that is, mobile station 46).

240 After receiving an Assignment Request message at signaling step 239, the base station 42 sends the IOS Assignment Complete message to the Serving MSCe 50.

241 Base station 36 sends a Connect message to the Serving MSCe 50 to indicate that the call has been answered by the mobile station associated with TLDN1 (that is, mobile station 40).

242 If the Serving MSCe 50 elected to initiate Termination-Side ringback at signaling step 227, then the Serving MSCe 50 will send a H.248 message to MGW 26. The H.248 message contains a MODIFY command to deactivate Termination-Side ringback.

243 The MGW 26 acknowledges the H.248 message of signaling step 242 by sending a H.248 Replay message to the Serving MSCe 50.

244 After receiving the CONNECT message from the base station 36 and the PRACK message is received at signaling step 232 (see FIG. 7), the Serving MSCe 50 sends a 200 OK message to the Originating MSCe 48. The 200 OK message includes Call-ID1, which identifies to the Originating MSCe 48 that mobile station 40 was the terminating device completing the call setup. When the INVITE request from signaling step 212 for the mobile station 40 includes an ISUP IAM Message then the 200 OK message may include an ISUP Answer ("ANM") message. The 200 OK message acknowledges that the INVITE (signaling step 212) message has succeeded.

245 Upon receiving a 200 OK message from any one of the initiated call setup requests (for example, the INVITE send in signaling step 212 to setup a call to the mobile station 40 or in signaling step 213 to setup a call to mobile station 46) the Originating MSCe 48 sends a 200 OK message to the originator of the INVITE request (signaling step 201). The 200 OK message including SDP-5 (that is the SDP received in signaling step 231 (see FIG. 7). The 200 Ok message includes SDP-5, instead of SDP-9, for the 200 OK message in signaling step 244 included Call-ID1. When the INVITE request from the initiating network at step 201 includes an ISUP IAM Message, then the 200 OK message may include an ANM message. The 200 OK message acknowledges that the INVITE at signaling step 201 message has succeeded.

246 The Originating MSCe 48 receives an ACK message. The ACK message confirms reception of the final response (that is, 200 OK at signaling step 245) for the Dialog identified by Call-ID0.

247 Upon receiving an ACK message at signaling step 246 for the Dialog identified by Call-ID0, the Originating MSCe 48 sends an ACK message to the Serving MSCe 50 to confirm reception of the final response (that is, 200 OK in signaling step 244) for the Dialog identified by Call-ID1.

248-54 Upon detecting the first potential terminating device to complete the call setup, in this instance mobile station 40, any call setups to remaining potential terminating device or devices are released. The release signaling steps 248-54 will be discussed in detail with reference to FIG. 8.

FIG. 5 is a signal flow diagram illustrating the call feature retrieval of signaling steps 203-210 of FIG. 4.

203-06 The home location register 52 recognizes the called number as having a multiple-termination routing feature, and that, based on the received TransactionCapability parameter, received in signaling step 202, the Originating MSCe 48 is capable of supporting a multiple-termination call. In this scenario, there are the two Mobile Station Identifiers (MSIDs) in the member list are registered in the same system; therefore, two ROUTREQs are sent to the Serving visitor location register 54, and the visitor location register 54 forwards the ROUTREQs to the Serving MSCe 50. The MSID is a private, unique identification of the subscriber.

208-10 In reaction to each ROUTREQ, the Serving MSCe 50 checks its internal data structures and determines that the mobile stations 40 (associated with MSID1) and mobile station 46 (associated with MSID2) are currently idle (or in similar call-ready states, such as the call is involved in another call, but has a call waiting feature). The Serving MSCe 50 then allocates two TLDNs. TLDN1 is associated with MSID1 and TLDN2 is associated with MSID2. The TLDN values are returned to the visitor location register 54 in a routreq. The visitor location register 54 sends each routreq to the home location register 52.

Figure 6:
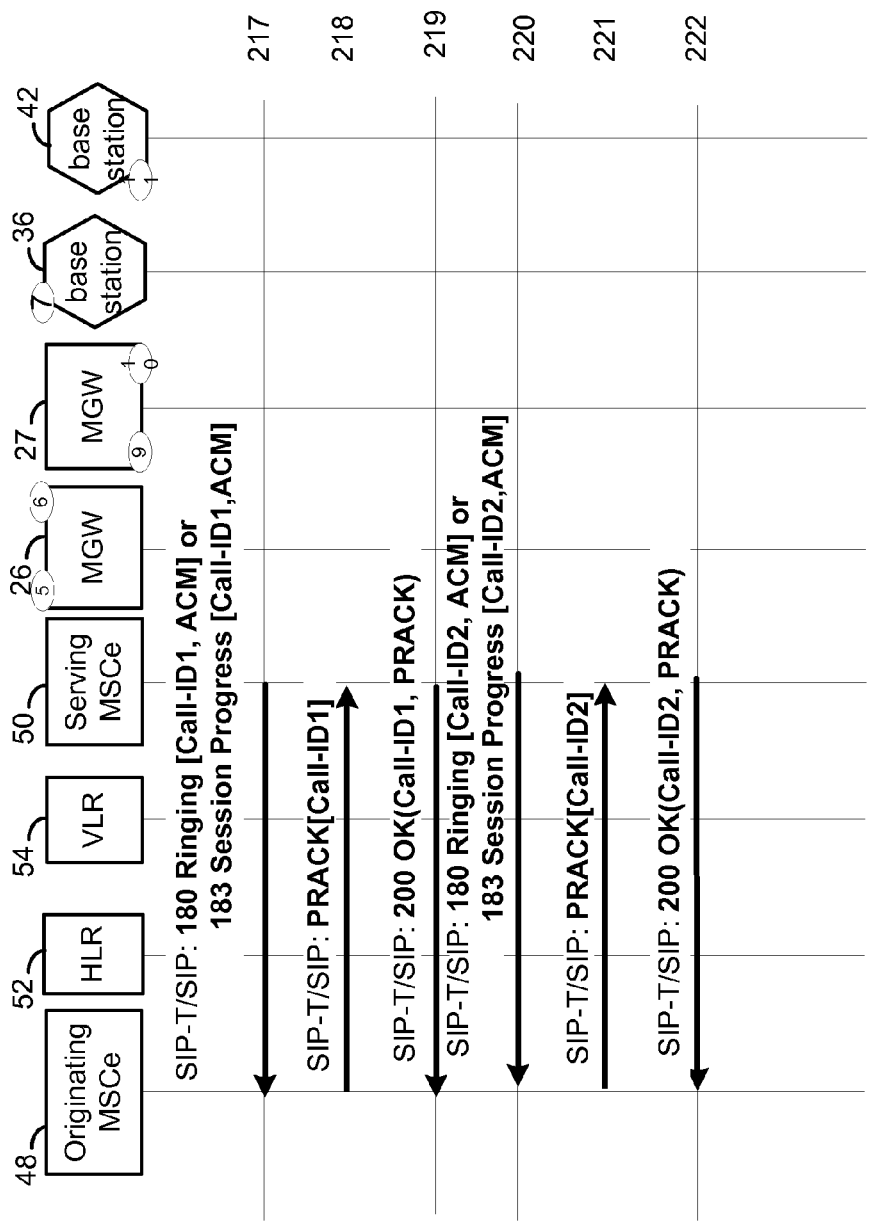
FIG. 6 is a signal flow diagram illustrating the ringing management signal sequence of FIG. 4.

FIG. 6 is a signal flow diagram illustrating the ringing management signal sequence of FIG. 4. In this sequence of step the Originating MSCe 48 receives the SIP provisional responses, indicating that the call setups to mobile station 40 and mobile station 46 are proceeding, from Serving MSCe 50 and acknowledges there reception with SIP PRACK. messages. Unlike a single termination scenario, when the Originating MSCe 48 receives any 18x messages from Serving MSCe 50, for example indicating a desire for local ringback, the 18x messages are terminated (that is not forward onward) by Originating MSCe 48:

217 After receiving the INVITE for a call setup to the mobile station 40 at signaling step 212, if the INVITE request did not include an ISUP IAM Message, the Serving MSCe 50 may send either a 180 Ringing message or a 183 Session Progress message to the Originating MSCe 48

When the INVITE request includes an ISUP IAM Message, the Serving MSCe 50 may send either a 180 Ringing message or a 183 Session Progress message including an ISUP ACM message to the Originating MSCe 48.

The purpose of the ISUP ACM message is to stop any timers in the Originating MSCe 48 that might be associated with the ISUP IAM sent in signaling step 212.

If the Serving MSC 50 elects to initiate local ringback then the 180 Ringing message is sent.

218 In response to the 180 Ringing message or a 183 Session Progress message at signaling step 217, a PRACK message is sent to the Serving MSCe 50.

219 The Serving MSCe 50 sends a 200 OK response to the Originating MSCe 48 in response to the PRACK message at signaling step 218.

220 After receiving the INVITE for the mobile station 46 at signaling step 213, if the INVITE request did not include an ISUP IAM Message the Serving MSCe 50 may send either a 180 Ringing message or a 183 Session Progress message to the Originating MSCe 48

When the INVITE request includes an ISUP IAM Message, the Serving MSCe 50 may send either a 180 Ringing message or a 183 Session Progress message including an ISUP ACM message to the Originating MSCe 48. The purpose of the ISUP ACM message is to stop any timers in the Originating MSCe 48 that might be associated with the ISUP IAM sent in signaling step 213. The Originating MSCe 48 does not forward the 180 Ringing message and/or the 183 Session Progress message, as may the case in single-termination call setups.

If the Serving MSC 50 elects to initiate local ringback then the 180 Ringing message is sent.

221 In response to the 180 Ringing message or a 183 Session Progress message at signaling step 220, a PRACK message is sent to the Serving MSCe 50.

222 The Serving MSCe 50 sends a 200 OK response to the Originating MSCe 48 in response to the PRACK message from signaling step 221.

Figure 7:
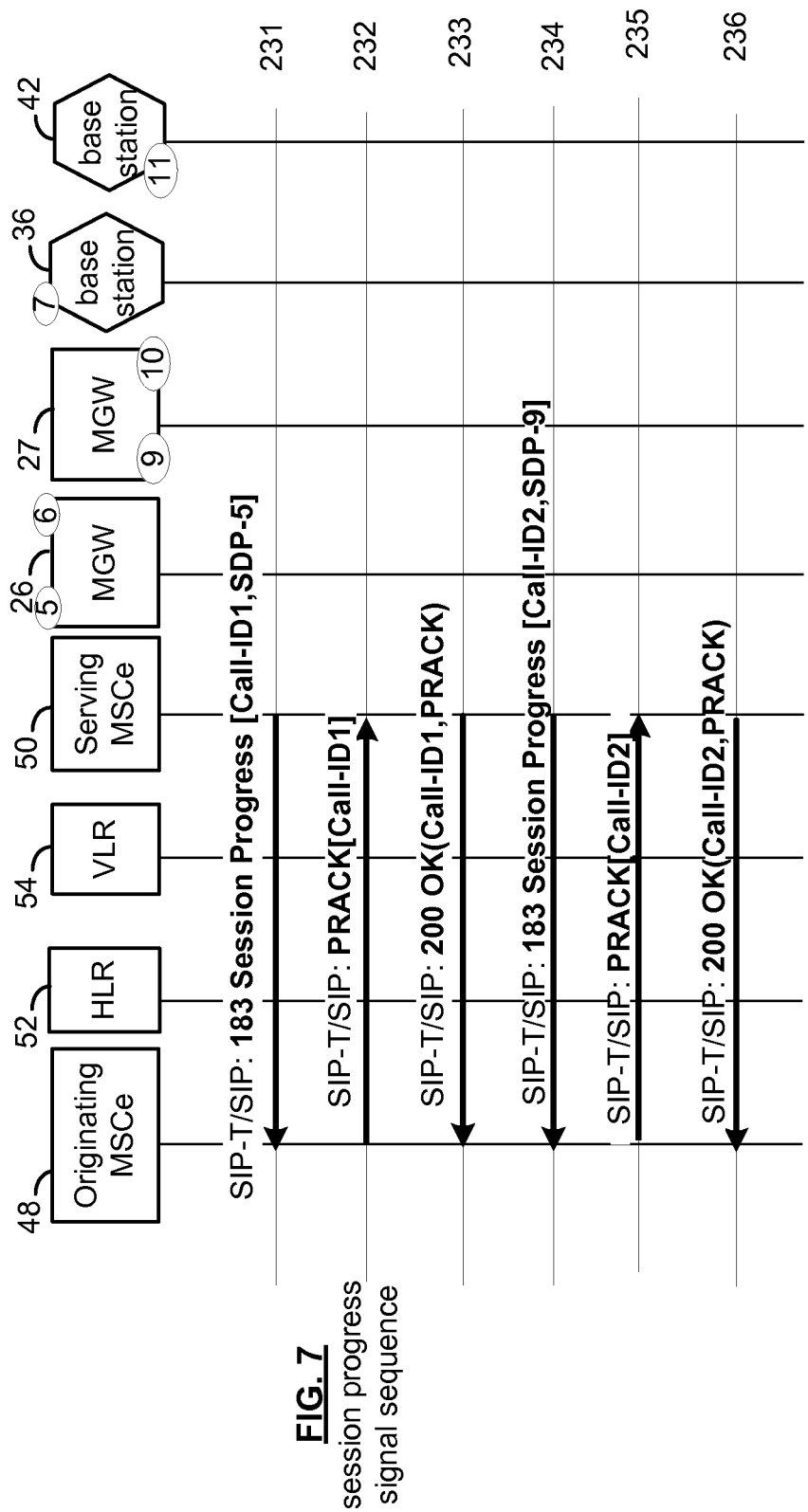
FIG. 7 is a signal flow diagram illustrating the session progress signal sequence of FIG. 4.

FIG. 7 is a signal flow diagram illustrating the session progress signal sequence of FIG. 4. The Originating MSCe 48 coordinates the multiple-termination routing for connection management. In this sequence of signaling steps, the Originating MSCe 48 receives the SIP provisional responses, indicating that the call setups to mobile station 40 and mobile station 46 are proceeding, from Serving MSCe 50 and acknowledges there reception with SIP PRACK messages. Unlike a single termination scenario the Originating MSCe stores any information received, for example SDP messages, in the SIP provisional responses and does not act. When the Originating MSCe 50 receives information as to which terminating device will actually complete the call setup (signaling step 244 which includes Call-ID1) does the Originating MSCe 50 retrieve the appropriate stored information and send it to the signaling entity supporting the calling party.

231 Upon receiving a Reply message in signaling step 228, the Serving MSCe 50 sends the Originating MSCe 48 a 183 Session Progress message including SDP-5.

Note the 183 Session Progress message is not sent to the originator of the INVITE message, signaling step 201.

232 In response to the 183 Session Progress message from signaling step 231, the Originating MSCe 48 stores SDP-5 and sends a PRACK message to the Serving MSCe 50.

233 The Serving MSCe 50 sends a response to the PRACK message from signaling step 232 to the Originating MSCe 48.

234 Upon receiving a Reply message in signaling step 230, the Serving MSCe 50 sends the Originating MSCe 48 a 183 Session Progress message including SDP-9.

Note the 183 Session Progress message is not sent to the originator of the INVITE message, signaling step 201.

235 In response to the 183 Session Progress message from signaling step 234, the Originating sends a PRACK message to the Serving MSCe 50.

236 The Serving MSCe 50 sends a response to the PRACK message from signaling step 235 to the Originating MSCe 48.

Figure 8:
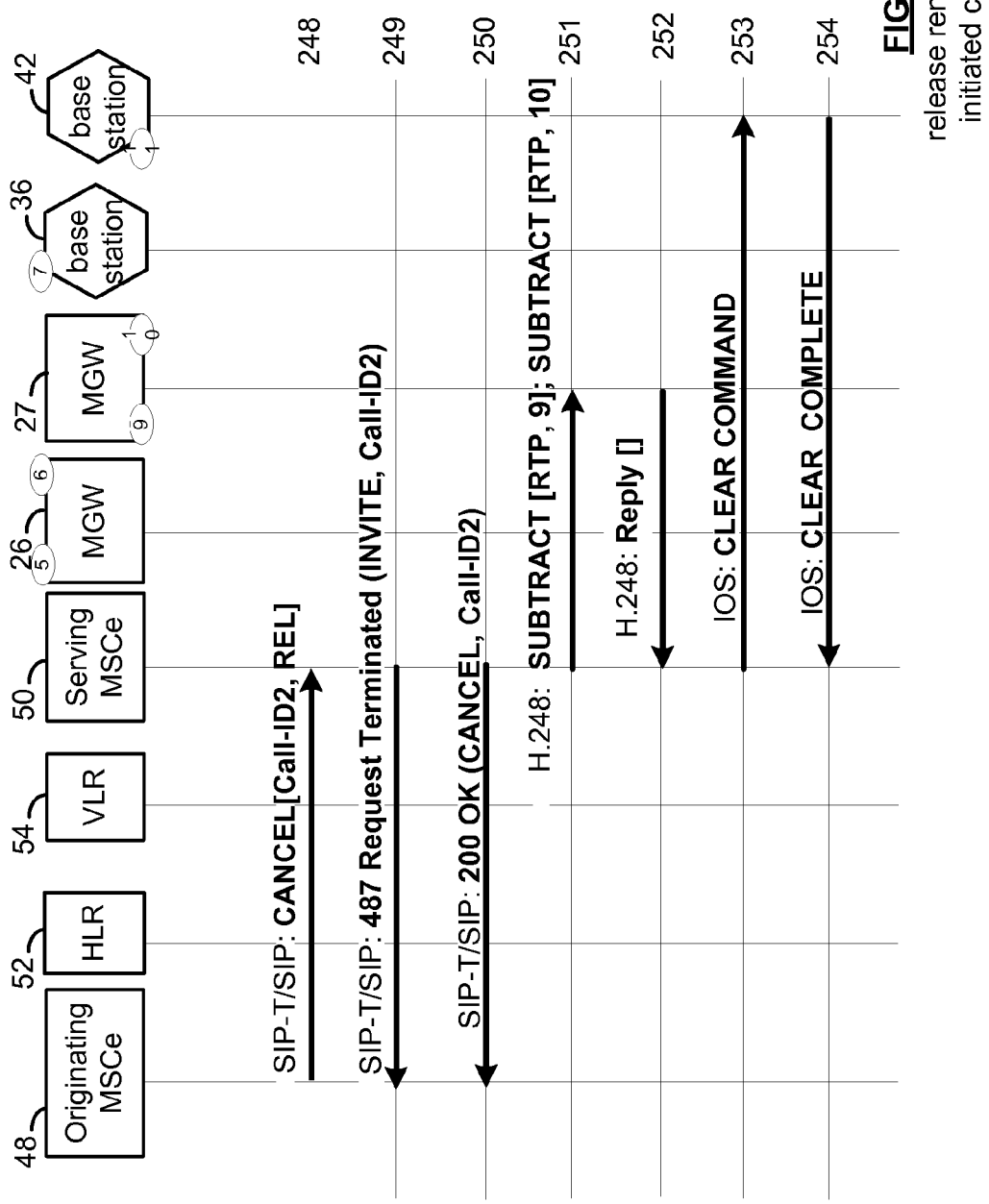
FIG. 8 is a signal sequence illustrating releasing the call setups to the remaining potential terminating devices of FIG. 4.

FIG. 8 is a signal sequence illustrating releasing the call setups to the remaining potential terminating devices of FIG. 4:

248 Upon receiving a 200 OK in signaling step 244, the Originating MSCe 48 releases all other call setup attempts. The Originating MSCe 48 sends an IOS CANCEL message to the Serving MSCe 50. If the INVITE request for the mobile station 46 in signaling step 213 included an ISUP IAM Message, then the CANCEL message may contain a REL message.

249 The Serving MSCe 50 sends a 487 Request Terminated message to the Originating MSCe 48. The Message is a response to the INVITE request from signaling step 213.

250 The Serving MSCe 50 answers the CANCEL request for the mobile station 46 in signaling step 248 by sending a 200 OK message to the Originating MSCe 48.

251 Upon receiving the CANCEL message of signaling step 248 from the Originating MSCe 248, the Serving MSCe 50 begins releasing all resources associated with the call setup attempt to the mobile station 46. The Serving MSCe 50 sends the MGW 27 a H.248 message consisting of two SUBTRACT commands. The first SUBTRACT command removes termination 10 to base station 42. The second SUBTRACT removes termination 9 for the bearer channel using RTP towards the packet network 22.

252 The MGW 27 replies to the H.248 message at signaling step 251 by sending Serving MSCe 50 with a H.248 Reply message.

253 Upon receiving the CANCEL message at signaling step 248 from the Originating MSCe 48, the Serving MSCe 50 sends a Clear Command to the base station 42 to instruct the base station 42 to release the associated dedicated resources.

254 The base station 42 sends a Clear Complete message to the Serving MSCe 50. The Serving MSCe 50 releases the underlying transport connection.

Figure 9:
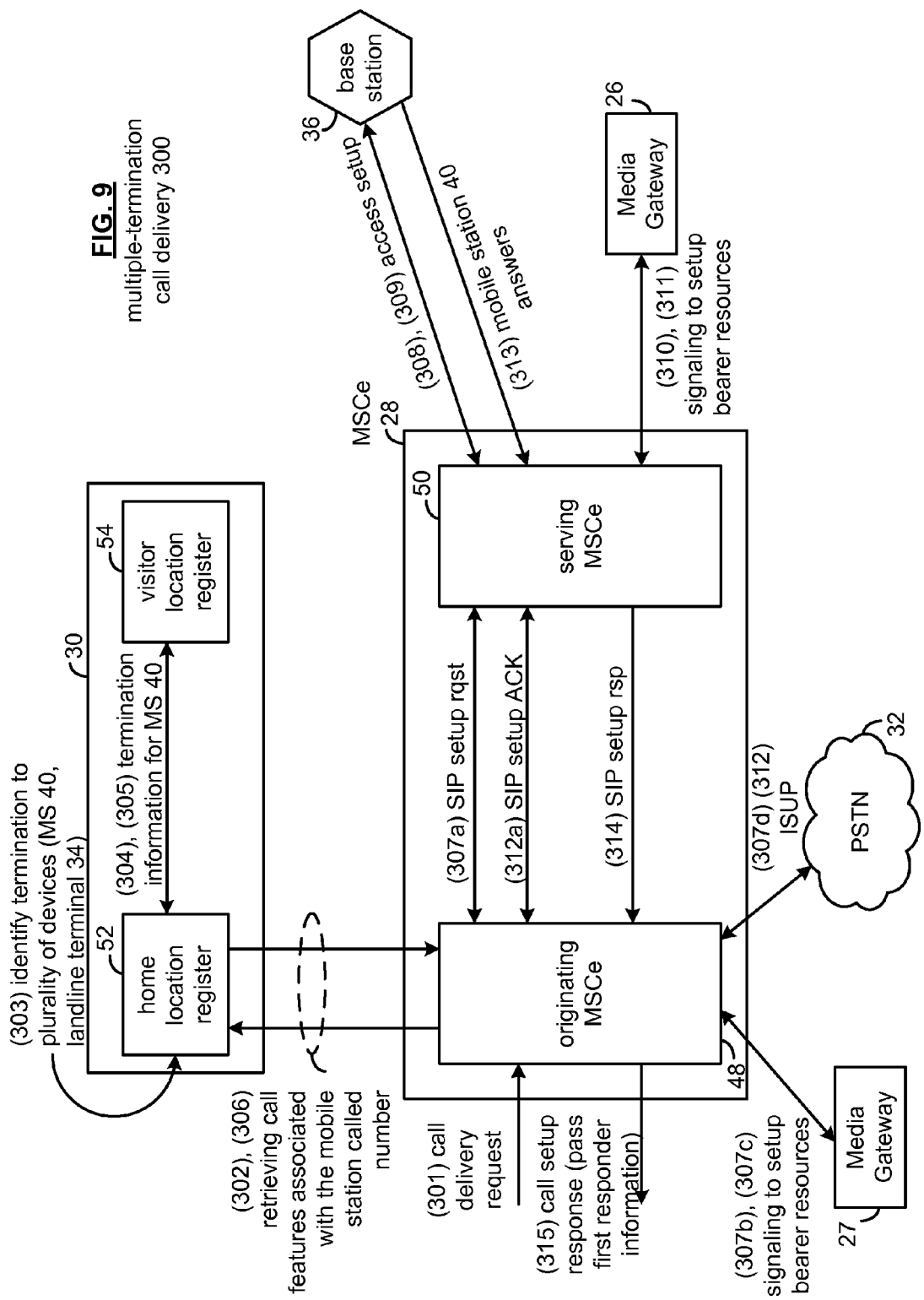
FIG. 9 is a functional block diagram of a multiple-termination call delivery with a mobile termination and a PSTN termination according to an embodiment of the invention.

FIG. 9 is a functional block diagram of a multiple-termination call delivery 100 to a mobile station serviced by the base station 36 and a landline terminal serviced by the PSTN 32. In operation, a call delivery request 301, which includes a called number, is provided to the Originating MSCe 48. The Originating MSCe 48 may receive the call setup request 301 from the packet network 22 (for example, the call delivery request 23 is a SIP INVITE request), or from the PSTN 32 (for example, the call delivery request 33 is an ISUP IAM). In response to the call delivery request, the Originating MSCe 48 makes a request 302 to HLR/VLR 30 to obtain any call features associated with the called number and information instruction the nature in which the Originating MSCe 48 should response to the call delivery request. The call features may include multiple-termination routing information, which includes a member list and termination triggers. The member list provides a list of potential terminating devices, and the termination triggers indicate when to request further instructions on call processing relating to each of the devices where call setups are being initiated. The information also provides the call setup sequence with respect to the list of potential terminating devices. The call sequence may be for consecutive call setups to each of the members, concurrent call setups to each of the members, and/or a mixture thereof.

In the present example, the member list includes mobile station 40 and the landline terminal 34, and provides for concurrent call setups. Based upon its subscriber information (for example location information), the home location register 52 retrieves termination information for the mobile station 40 at steps 304 and 305 via the visitor location register 54. The HLR/VLR 30 returns call features associated with the called number in response 306.

Having retrieved the call features, the Originating MSCe 48 determines whether the call features include multiple-termination routing information to a plurality of potential terminating devices. The Originating MSCe 48 uses the routing information to determine whether the terminating device is being served by another MSCe, a legacy MSC, or if neither, by the PSTN 32. If the terminating device is being served by an MSCe, the Originating MSCe 48 will use SIP for the call control protocol. If the routing is to the PSTN 32, the originating MSCe uses ISUP for the call control protocol. In the present example, a MSCe serves the mobile station 40 The Originating MSCe 48 sends a SIP setup request 307*a* to the Serving MSCe 50 to attempt a call setup with mobile station 40. The Originating MSCe 48 sends signaling message 307*b*, for example a H.248 ADD command, to the media gateway 27 to setup bearer resources to support a call setup to landline terminal 34. The media gateway 27 acknowledges the bearer resource setup with signaling message 307*c* sent to the Originating MSCe 50. Using the information received in signaling message 307*c*, the Originating MSCe 48 sends ISUP signaling, for example an ISUP IAM, to PSTN 32 to attempt a call setup with landline terminal 34.

With respect to the mobile station 40, the Serving MSCe 50, initiates an access setup to the base station 36 at 308. After mobile 40 responds, base station 36, at 309, sends an access setup to the Serving MSCe 50. In preparation for the call path with the mobile station 40, the Serving MSCe 50 sends a signaling message at 310, for example, a H.248 ADD command, to the media gateway 26 to set up the bearer resources to support a call setup to the mobile station 40. The media gateway 26 acknowledges the bearer resource setup with a signaling message at step 311.

The call setup status for mobile station 42 and is provided to the Originating MSCe 48 via the SIP setup ACK at step 312*a*. The call status for landline terminal 34 is provided to the Originating MSCe 48 via ISUP at step 312*b*. In this instance, the call setup is completed by the mobile station 40, as in having been answered. The base station 36 informs the Serving MSCe 50 at step 313. In response to 313, the SIP setup response at 314 is sent to the Originating MSCe 48 from the Serving MSCe 50. The Originating MSCe 48 completes the call setup by sending the call setup response at step 315 that includes information about the first responder—in this example, mobile station 40. The Originating MSCe 48 releases the remaining potential terminating device, landline terminal 34, and any bearer resources (for example, those bearer resources in Media Gateway 27) that were allocated to the call setup to the landline terminal 34.

Figure 10:
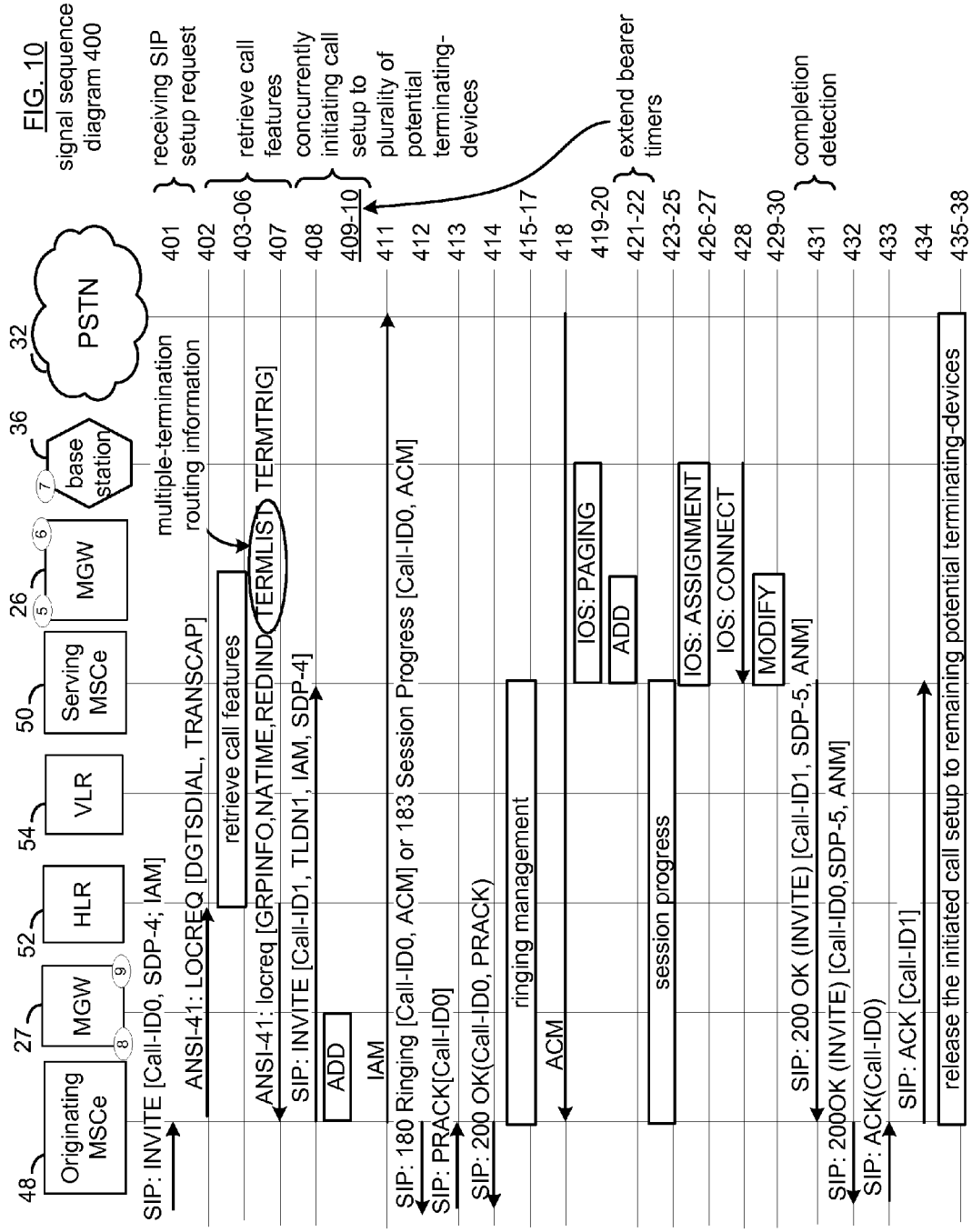
FIG. 10 is a signal flow diagram 400 illustrating call delivery for concurrent multiple-termination routing including a mobile termination and a PSTN termination according to an embodiment of the invention.

FIG. 10 is a signal flow diagram 400 illustrating call delivery for concurrent multiple-termination routing via the base station 36 and the PSTN 32. For purposes of this example, the mobile station 40, serviced by the base station 36, is presently served by a MSCe other than the Originating MSCe 48. The Originating MSCe 48 is defined as the home MSCe for the called number from the initiating device. Because the second member of the member list is a PSTN directory number, a media gateway 27 is required in the originating/serving network 13 to support the PSTN call setup. In this example, the mobile station 40 completes (that is, answers) the call setup first and thus the PSTN call setup is abandoned:

401. The Originating MSCe 48 receives an INVITE message including a SDP message labeled SDP-4 and a called number. The INVITE may contain an encapsulated ISUP IAM.

402. The Originating MSCe 48 sends a LOCREQ to the HLR associated with the called number. The Originating MSCe 48 may optionally include the TransactionCapability parameter to specify the appropriate termination handling.

403-06 The call features associated with the called number are retrieved via the HLR 52. Retrieval of the call features will be discussed in detail with reference to FIG. 11.

407 When all routreqs are received by the home location register 52, it returns a locreq to the Originating MSCe 48. The locreq includes multiple-termination routing information in the form of the TerminationList parameter ("TERMLIST"), along with an indication of the reason for extending the incoming call (that is, for multiple-termination routing) in the DMH_RedirectionIndicator ("REDIND") parameter. The TerminationList parameter includes a member list providing the plurality of potential terminating devices, and termination triggers that indicate when to request further instructions on call processing relating to each of the devices where call setups are being initiated. In this scenario the TerminationList parameter includes two terminations: an intersystem termination for the first member of the member list, and a PSTN termination for the second member of the member list.

408 After receiving the locreq at signaling step 407, the Originating MSCe 48 initiates a call setup to each of the plurality of potential terminating devices (that is, mobile station 40 and the landline terminal 34). Upon analysis of the intersystem termination information, the Originating MSCe 48 determines that the intersystem termination is associated with an MSCe. Accordingly, the call setup uses SIP-T/SIP with the MSCe serving the termination device. The Originating MSCe 48 sends an INVITE message to the Serving MSCe 50 including Call-ID1, TLDN1 and SDP-4 to setup a call to the first member of the member list (that is, the mobile station 40). The INVITE may contain an encapsulated ISUP IAM message. Note that the Originating MSCe 48 may elect to modify SDP-4 from that received in signaling step 401. Note that this INVITE request is for the establishment of a Dialog between the Originating MSCe 48 and the Serving MSCe 50 and is a different Dialog than that related to the INVITE request (see signaling step 401) received by the Originating MSCe 48. The dialog between Originating MSCe 48 and the Serving MSCe 50 for a call setup to mobile station 40 is identified by Call-ID1. The Serving MSCe 50 will use TDLN1 to make the association with MSID1 received in the ROUTREQ message of signaling step 404 (see FIG. 11).

409 After receiving the locreq at signaling step 407, the Originating MSCe 48 establishes a context with the MGW 27.

Note that the reason the Originating MSCe 48 establishes a context with the MGW 27 is because the TerminationList parameter received in signaling step 407 included a PSTN termination, and the Originating MSCe 48 determined that ISUP must be used for the call setup. If the Originating MSCe 48 had determined that SIP could have been used for the call setup then there would be no requirement to have bearer resources allocated in MGW 27 for this termination.

The H.248 message sent from the Originating MSCe 48 to the MGW 27 includes two ADD commands. The first ADD command establishes termination 8 for a bearer channel using RTP towards the packet network 22. The first ADD command includes a SDP-4, which is the remote SDP including the connection information for the bearer entity supporting the calling party (for example MGW 20 supporting a call initiated by mobile station 12). Connection information may include an IP Address and a User Datagram Protocol ("UDP") Port number.

The first ADD command may also contain a BT (Bearer Timer) parameter indicating, in seconds, the length of time MGW 27 waits without receiving data from the connection endpoint defined in SDP-4 before applying an error treatment to termination 8 (for example removing termination 8 from the bearer channel using RTP towards the packet network 22 and sending a message to the Originating MSCe 48 informing it of the action). The Originating MSCe 48, from the TERMLIST parameter in the locreq message (signaling step 407), is aware that the call setup is one termination of a multiple-termination routing scenario. In general the call setup time of a multiple-termination routing scenario is greater than the call setup time of a single termination scenario. The Originating MSCe 50 may, on a per call setup basis, adjust the value of BT based on knowledge it may have about the call setup.

The second ADD command establishes termination 9 for a PSTN communication channel (for example, DS0 on a T1 or E1 line) with a mode set to recvonly (or sendrecv).

410 The MGW 27 replies to the H.248 message of signaling step 409, by sending the Serving MSCe 50 a H.248 Replay message. The H.248 Reply message includes SDP-8, the local SDP for the MGW 27. SDP-8 includes connection information, such as an IP address, a UDP Port number, and a list of Codecs that the MGW 27 supports for sending and receiving.

411 The Originating MSCe 48 sends an ISUP IAM to setup a call to the second member of the member list (that is, the PSTN directory number corresponding to the landline terminal 34).

412 After receiving the locreq in signaling step 407, if the INVITE request of signaling step 401 did not contain an ISUP IAM Message, the Serving MSCe 50 may send either a 180 Ringing message or a 183 Session Progress message to the originator of the INVITE request (signaling step 401).

When the INVITE request in signaling step 401 includes an ISUP IAM Message, the Originating MSCe 48 may send either a 180 Ringing message or a 183 Session Progress message including an ISUP ACM (Address Complete Message) message to the originator of the INVITE request at signaling step 401.

If the Originating MSCe 48 elects to initiate local ringback, then a 180 Ringing message is sent; otherwise a 183 Session Progress message is sent. For a call setup to a single terminating device the MSCe (or the serving exchange for a landline terminal device) that is serving the terminating device controls all aspects of ringback to the calling party. When multiple-termination routing is performed the control logic within Originating MSCe 48 controls all aspects of ringback to the calling party. Accordingly, in this message exchange, when the call delivery request of signaling step 401 is a SIP INVITE, the Originating MSCe 48 may respond to the received call delivery request with a ringback message that instructs the sender of the call delivery request to generate ringback to the calling party terminating device.

413 In response to the 180 Ringing or 183 Session Progress message, a PRACK message is sent to the Originating MSCe 48.

414 The Originating MSCe 48 sends a 200 OK response to the PRACK message (signaling step 413).

415-17 The ringing management between the originating MSCe 48 and the Serving MSCe 50 prevents the Serving MSCe 48 from controlling local ringback to the calling party. Ringing management 415-17 will be discussed in detail with reference to FIG. 12.

418 The Originating MSCe 48 receives an ISUP ACM associated with the PSTN call setup to landline terminal 34.

419 After receiving an INVITE message in signaling step 408, the Serving MSCe 50 sends a PAGING REQUEST message to initiate a mobile terminated call setup scenario for the mobile station associated with TLDN1 (that is, mobile station 40). The PAGING REQUEST message includes the "Desired Codec" for the mobile station 40.

420 When the terminating mobile station responds to the page, a PAGING RESPONSE message is sent from the base station 36 to the Serving MSCe 50. The PAGING RESPONSE message includes the codec chosen by the mobile station 40. The PAGING RESPONSE message may contain a list of available BS transcoders, and the connection information for the base station 36 communications channel at termination 7.

421 The Serving MSCe 50 establishes a context with a MGW 26. The H.248 message sent from the Serving MSCe 50 to the MGW 26 includes of two ADD commands. The first ADD command establishes a termination for a bearer channel using RTP towards the packet network 22. The mode is set to sendrecv. If the Serving MSCe 50 elects to initiate Termination-Side ringback, then ringback from termination 5 is initiated. SDP-4 is the remote SDP including the connection information for the bearer entity supporting the calling party (for example MGW 20 supporting a call initiated by mobile station 12), Connection information may include an IP Address and a User Datagram Protocol ("UDP") Port number).

Note that any ringback tone generated by the MGW 26 will not be received by the calling party. As mentioned with respect to signaling step 412 the Originating MSCe 48 controls all aspects of ringback to the calling party for multiple-termination routing scenarios. The bearer entity supporting the calling party will not allow received data to be passed to the calling party until the bearer entity is assured that the data is coming from a trusted source. The Originating MSCe 48 controls the flow of all messaging to the network entities support the calling party. It is only when the Originating MSCe 48 sends a 200 OK (INVITE) including a SDP (with the connection information of the trusted source) that is in response to the SIP INVITE of signaling step 201 will the bearer entity supporting the calling party will allow received bearer data to be passed to the calling party. The second ADD command establishes a termination for the base station 36 communication channel with a mode set to sendrecv. The second ADD command includes SDP-7, which is the remote SDP including the base station connection information (that is, information sent in signaling step 420 that relates to termination 7).

The first ADD command may also contain a BT (Bearer Timer) parameter indicating, in seconds, the length of time MGW 26 waits without receiving data from the connection endpoint defined in SDP-4 before applying an error treatment to termination 5 (for example removing termination 5 from the bearer channel using RTP towards the packet network 22 and sending a message to the Serving MSCe 50 informing it of the action). The Serving MSCe 50, from the LEGINFO1 parameter in the Routereq message (signaling step 404), is aware that the call associated with TLDN1 is one termination of a multiple-termination routing scenario. In general the call setup time of a multiple-termination routing scenario is greater than the call setup time of a single termination scenario. The Serving MSCe 50 may, on a per call setup basis, adjust the value of BT based on knowledge it may have about the call setup.

422 The MGW 26 replies to the H.248 message of signaling step 421 by sending the Serving MSCe 50 an H.248 Reply message. The Reply message includes SDP-5 and SDP-6. SDP-5 is the local SDP for the termination (identified by the connection information) given in SDP 4, and includes the MGW 26 connection information for termination 5. SDP-6 is the local SDP for the termination towards the base station 36 and includes the connection information (for example, IP address and UDP Port number) for termination 6.

423-25 The session progress signaling addresses the handshake operation between the Serving MSCe 50 and the Originating MSCe 48. The session progress interaction of the Originating MSCe 48 with the Serving MSCe 50 operates to provide connection management for the call setups. The session progress signaling 423-25 will be discussed in detail with reference to FIG. 13.

426 After receiving the Reply message at signaling step 422, the Serving MSCe 50 sends an IOS Assignment Request message to the base station 36 to request assignment of radio resources. The Assignment Request message includes the MGW 26 connection information (for termination 6, obtained from signaling step 422), request of any base station transcoding (if necessary) and the codec assignment for the mobile station 40 associated with TDLN1.

427 After receiving an IOS Assignment Request message at signaling step 427, the base station 36 sends the IOS Assignment Complete message to the Serving MSCe 50.

428 The base station 36 sends a CONNECT message to the Serving MSCe 50 to indicate that the call has been answered by the mobile station associated with TLDN1 (that is, mobile station 40).

429 If the Serving MSCe 50 elected to initiate Termination-Side ringback (in signaling step 421), then the Serving MSCe 50 will send a H.248 message to MGW 26. The H.248 message includes a MODIFY command to deactivate Termination-Side Ringback.

430 The MGW 26 acknowledges the H.248 message of signaling step 429 with a H.248 Reply message sent from MGW 26 to Serving MSCe 50.

431 After receiving the CONNECT message from the base station 36 and the PRACK message (see FIG. 13, signaling step 424) is received, the Serving MSCe 50 sends a 200 OK message to the Originating MSCe 48. When the INVITE request at signaling step 408 includes an ISUP IAM Message, then the 200 OK message may contain an ISUP ANM (Answer Message) message. The 200 OK message acknowledges that the INVITE message from signaling step 408 has succeeded. In this manner, the Originating MSCe 48 detects a first potential terminating device to complete the initiated call setup.

432 Upon receiving a 200 OK message or an ISUP ANM message from any one of the call setup requests (for example, from the INVITE message of signaling step 408 or the ISUP IAM in signaling step 411) the Originating MSCe 48 sends a 200 OK message to the originator of the INVITE request of signaling step 401. Since the intersystem termination (that is, the mobile station 40) answered first, the 200 OK message includes SDP-5 (that is, the SDP received in signaling step 423). When the INVITE request from signaling step 401 includes an ISUP IAM message, then the 200 OK message may contain an ISUP ANM message. The 200 OK message acknowledges that the INVITE request from signaling step 401 message succeeded.

Note that if the PSTN termination answered first, then the 200 OK message would contain the SDP-8 received in signaling step 410.

433 The Originating MSCe 48 receives an ACK message. The ACK message confirms reception of the final response (that is, the 200 OK from signaling step 432) for the Dialog identified by Call-ID0.

434 Upon receiving an ACK message in signaling step 433, the Originating MSCe 48 sends an ACK message to the Serving MSCe 50 to confirm reception of the final response (that is, the 200 OK from signaling step 431) for the Dialog identified by Call-ID1.

435-38 Upon detecting a first potential terminating device to complete the call setup, any call setups to remaining potential terminating device or devices are released. The release signaling steps 435-38 will be discussed in detail with reference to FIG. 14.

Figure 11:
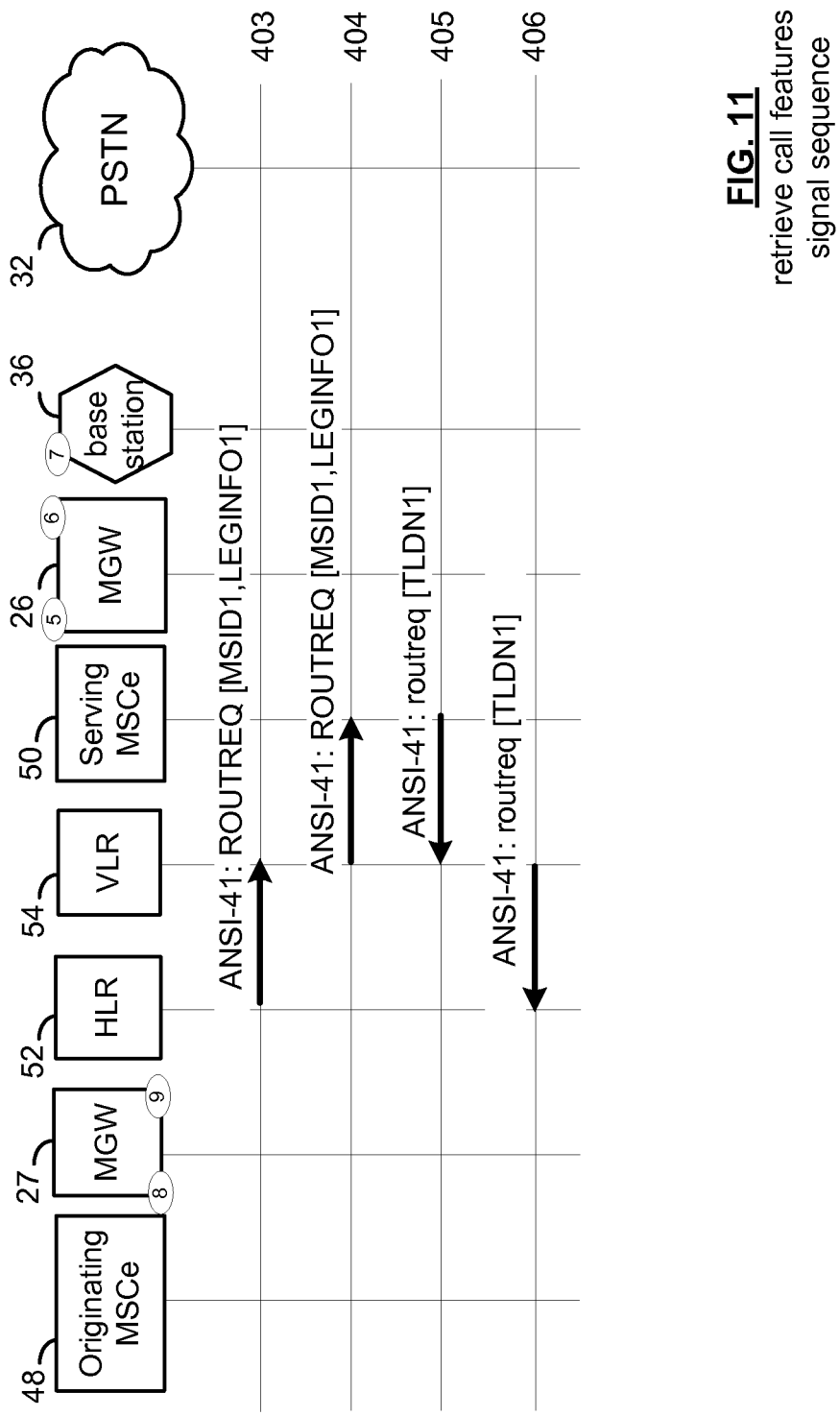
FIG. 11 is a signal flow diagram illustrating retrieve call features of FIG. 10.

FIG. 11 is a signal flow diagram illustrating retrieve call features of FIG. 10:

403-04 The HLR 52 recognizes the called number as a member of a multiple-termination routing and that, based on the received TransactionCapability parameter the Originating MSCe 48, is capable of supporting a multiple-termination routing to a plurality of potential terminating devices. In this case, the first member in the member list (that is, the mobile station 40) is registered in another system; therefore, a ROUTREQ is sent to the visitor location register 54, which forwards the ROUTREQ to the Serving MSCe 50.

405-06 In response to the ROUTREQ, the Serving MSCe 50 checks its internal data structures and determines that the mobile station 40 is currently idle (or in similar call-ready states, such as the call is involved in another call, but has a call waiting feature). The Serving MSCe 50 allocates a TLDN and returns this information to the visitor location register 54 in a routreq response. The VLR 54 sends the routreq to the home location register 52.

Figure 12:
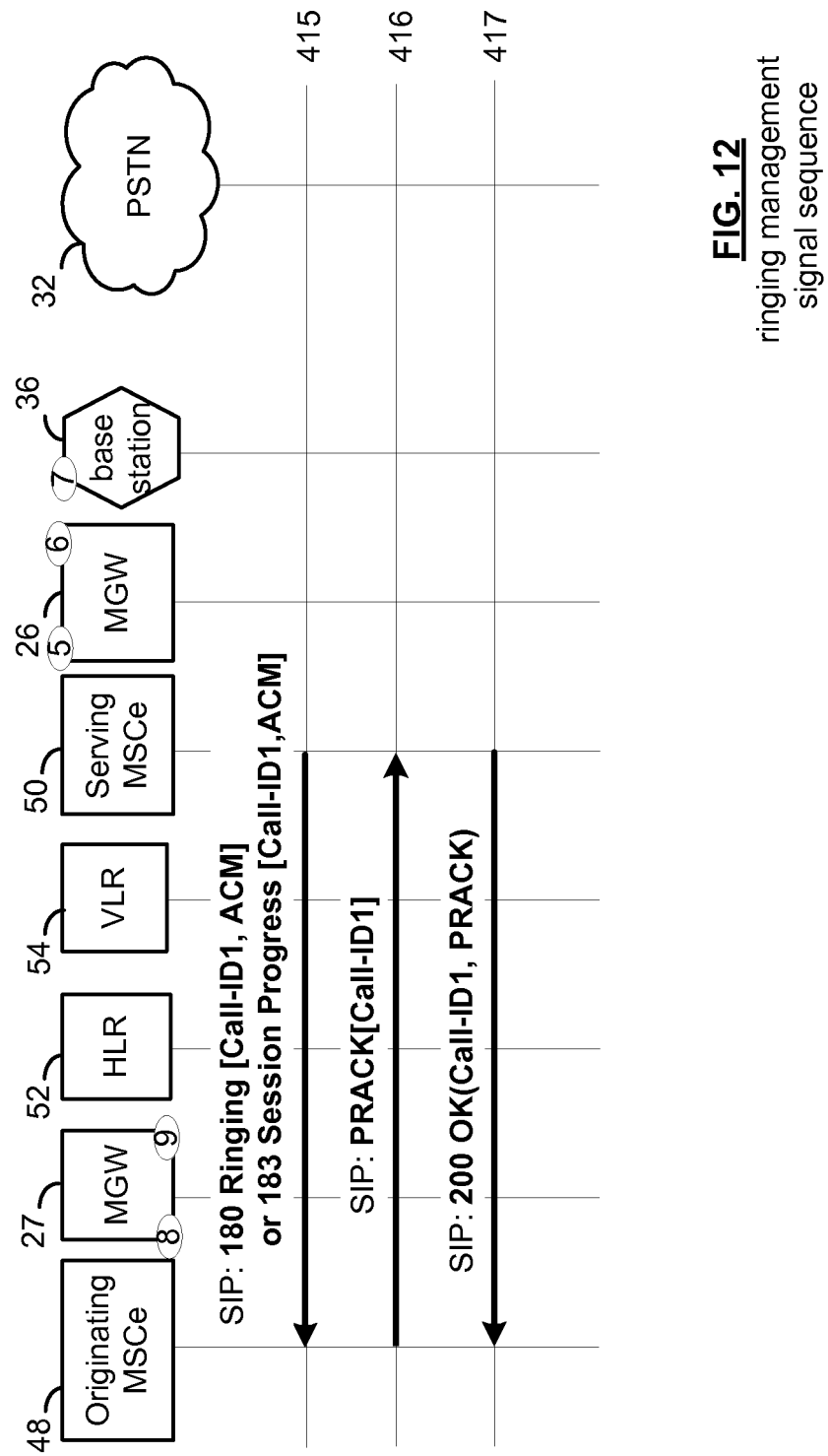
FIG. 12 is a signal flow diagram illustrating the ringing management signal sequence of FIG. 10.

FIG. 12 is a signal flow diagram illustrating the ringing management signal sequence of FIG. 10. In this sequence of steps, the Originating MSCe 48 receives a SIP provisional response, indicating that the call setup to mobile station 40 is proceeding, from Serving MSCe 50 and acknowledges the reception with a SIP PRACK. Unlike a single termination scenario, when the Originating MSCe 48 receives any 18x messages from Serving MSCe 50 (such as for indicating a desire for local ringback), the 18x message is terminated (that is not forwarded onward to the packet network 22) by the Originating MSCe 48.

415 After receiving the INVITE of signaling step 408, if the INVITE request did not contain an ISUP IAM Message, the Serving MSCe 50 can send either a 180 Ringing message or a 183 Session Progress message to the Originating MSCe 48.

When the INVITE request includes an ISUP IAM Message, the Serving MSCe 50 may send either a 180 Ringing message or a 183 Session Progress message including an ISUP ACM message to the Originating MSCe 48.

If the Serving MSCe elects to initiate local ringback then the 180 Ringing message is sent.

416 In response to the 180 Ringing message or a 183 Session Progress message of signaling step 415, a PRACK message is sent from the Originating MSCe 48 to the Serving MSCe 50.

417 The Serving MSCe 50 sends a 200 OK response to the Originating MSCe 48 in response to the PRACK message of signaling step 416.

Figure 13:
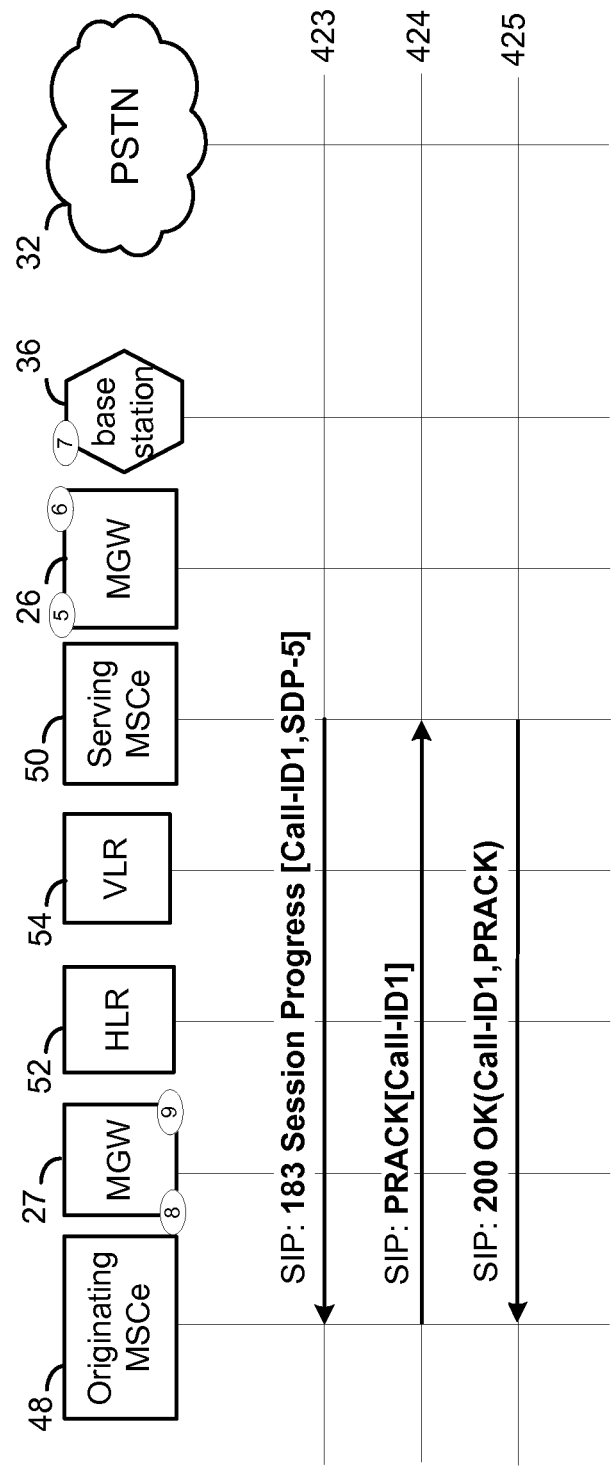
FIG. 13 is a signal flow diagram illustrating the detailed session progress signal sequence of FIG. 10.

FIG. 13 is a signal flow diagram illustrating the detailed session progress signal sequence of FIG. 10 for connection management. In this sequence of steps, the Originating MSCe 48 receives a SIP provisional response from Serving MSCe 50, indicating that the call setups to mobile station 40 is proceeding, and also acknowledging the Serving MSCe 50 reception of the SIP PRACK message. Unlike a single termination scenario, the Originating MSCe will store any information received (such as SDP messages) in the SIP provisional response and does not act. Only when the Originating MSCe 50 receives information as to which of the terminating devices completes the call setup (signaling step 431 which includes Call-ID1) does the Originating MSCe 50 retrieve the appropriate stored information and send it to the signaling entity supporting the calling party.

423 Upon receiving a Reply message in signaling step 422, the Serving MSCe 50 sends the Originating MSCe 48 a 183 Session Progress message including SDP-5.

Note the 183 Session Progress message is not sent to the originator of the INVITE message, signaling step 401.

424 In response to the 183 Session Progress message of signaling step 423, the Originating MSCe 48 stores SDP-5, and sends a PRACK message to the Serving MSCe 50.

425 The Serving MSCe 50 sends a response to the PRACK message of signaling step 424 to the Originating MSCe 48.

Figure 14:
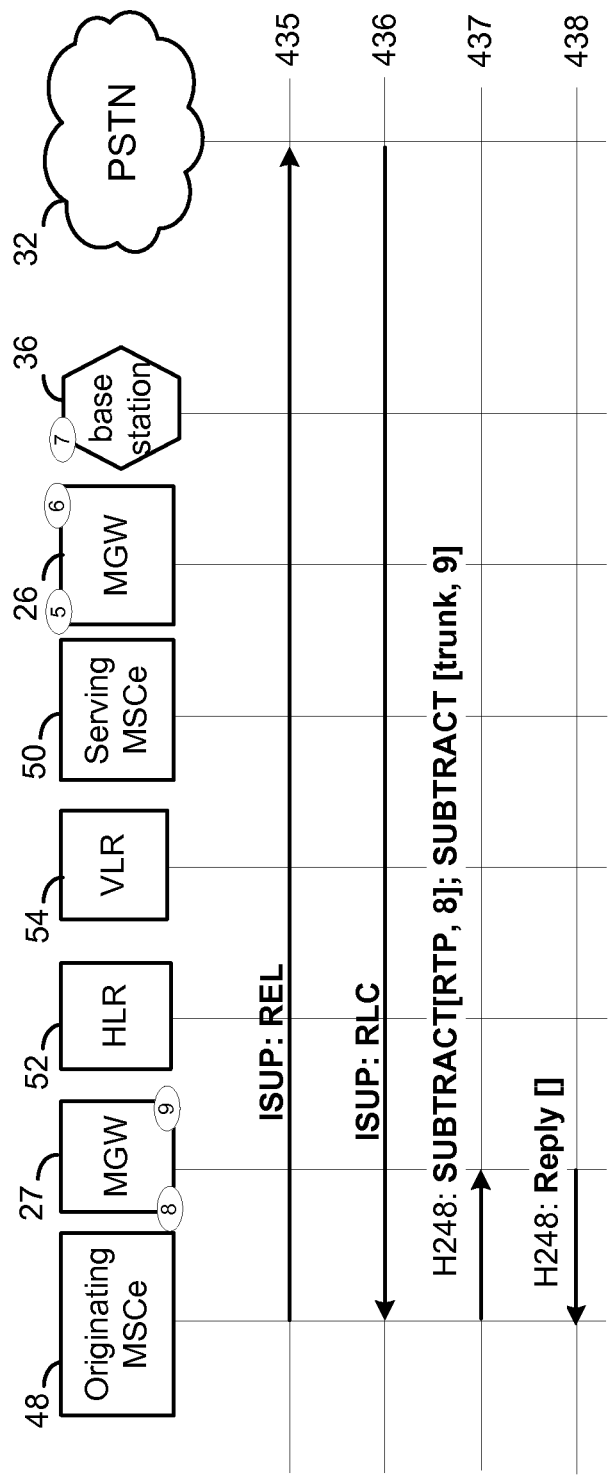
FIG. 14 is a signal flow diagram illustrating the release of the call setups to the remaining potential terminating devices of FIG. 10.

FIG. 14 is a signal flow diagram illustrating the release of the call setups to the remaining potential terminating devices of FIG. 10:

435 Upon receiving a 200 OK message (signaling step 431), the Originating MSCe 48 sends an ISUP REL (Release) message to release the PSTN call setup.

436 The Originating MSCe 48 receives an ISUP RLC (Release Complete) message signaling completion of the PSTN call setup release.

437 Upon receiving a 200 OK message in signaling step 431, the Originating MSCe 48 sends the MGW 27 an H.248 message. The H.248 message includes two SUBTRACT commands to remove termination 8 and termination 9.

438 The MGW 27 replies to the H.248 message of signaling step 437 with a Reply message.

FIGS. 15*a* and 15*b* are a signal flow diagram 500 illustrating call delivery for consecutive multiple-termination routing. The example provides two multiple-terminations: the mobile station 40 via the base station 36, and the mobile station 46 via the mobile station 42.

501 The Originating MSCe 48 receives an INVITE message including a SDP message labeled SDP-4 and a called number. The INVITE may contain an encapsulated ISUP IAM. The Originating MSCe 48 is the MSCe that owns the called number dialing by the calling party (for example mobile station 12).

502 The Originating MSCe 48 sends a LOCREQ to the home location register 52 associated with the called number. The Originating MSCe 48 may optionally include the TransactionCapability parameter to specify the appropriate termination handling.

503-06 The call features associated with the called number are retrieved via the home location register 52. Retrieval of the call features will be discussed in detail with reference to FIG. 16.

507 When the routreqs are received by the home location register 52 from signaling steps 503-06, the HLR 52 returns a locreq to the Originating MSCe 48. The locreq includes termination routing information for the first group member in the form of the TerminationList parameter, along with an indication of the reason for extending the incoming call (that is, for multiple-termination routing) in the DMH_RedirectionIndicator ("REDIND") parameter. In this scenario the TerminationList member list includes an intersystem termination for the first member, mobile station 40. The NATIME (No Answer TIME) parameter indicates, in seconds, the length of time the Originating MSCe 48 waits before applying a no-answer treatment to the call setup.

508 After receiving the locreq from signaling step 507, the Originating MSCe 48 determines that the intersystem termination is associated with an MSCe and thus SIP-T/SIP will be used for the call setup to the MSCe serving the termination device. The Originating MSCe 48 sends an INVITE message to the Serving MSCe 50 including Call-ID1, TLDN1 and SDP-4 to setup a call to the member in the multiple-termination member list (that is, the mobile station 40). The INVITE can contain an encapsulated ISUP IAM message. Note that the Originating MSCe 48 can elect to modify SDP-4 as received in signaling step 501. Note that the INVITE request of this signaling step is for the establishment of a Dialog between the Originating MSCe 48 and the Serving MSCe 50, and is a different Dialog than that related to the INVITE request of signaling step 501 received by the Originating MSCe 48. The Serving MSCe 50 will use TDLN1 to make the association with MSID1 received in the ROUTREQ message of signaling step 504 (see FIG. 16).

509 After receiving the locreq in signaling step 507, if the INVITE request of signaling step 501 did not contain an ISUP IAM Message, the Serving MSCe 50 may send either a 180 Ringing message or a 183 Session Progress message to the originator of the INVITE request (Step 1).

When the INVITE request (Step 501) includes an ISUP IAM Message the Originating MSCe 48 may send either a 180 Ringing message or a 183 Session Progress message including an ISUP ACM message to the originator of the INVITE request of signaling step 501.

If the Originating MSCe 48 elects to initiate local ringback, then a 180 Ringing message is sent. Otherwise, a 183 Session Progress message is sent. For a call setup to a single terminating device, the Serving MSCe that serves the terminating device controls all aspects of ringback to the calling party. When multiple-termination routing is performed, the control logic within the Originating MSCe 48 controls all aspects of ringback to the calling party. Accordingly, in this messaging exchange, when the call delivery request of signaling step 501 is a SIP INVITE, the Originating MSCe 48 may respond to the received call delivery request with a ringback message that instructs the sender of the call delivery request to generate ringback to the calling party terminating device.

510 In response to the 180 Ringing or 183 Session Progress message, a PRACK message is sent to the Originating MSCe 48.

511 The Originating MSCe 48 sends a 200 OK response to the PRACK message of signaling step 510.

512-14 The ringing management between the Originating MSCe 48 and the Serving MSCe 50 prevents the Serving MSCe from controlling local ringback to the calling party. Ringing management 512-14 will be discussed in detail with reference to FIG. 17.

515 After receiving the INVITE message in signaling step 508, the Serving MSCe 50 sends an MS PAGING REQUEST message to the base station 36 to initiate a mobile terminated call setup scenario for the mobile station associated with TLDN1 (that is, mobile station 40). The PAGING REQUEST message includes the "Desired Codec" for the mobile station 40.

516-20 When the terminating mobile station 40 responds to the page, an IOS PAGING RESPONSE message is sent from the base station 36 to the Serving MSCe 50. The PAGING RESPONSE message includes the codec chosen by the mobile station 40. The PAGING RESPONSE message may contain a list of available base station 36 transcoders, and the connection information for the base station communications channel at termination 7.

521 The Serving MSCe 50 establishes a context with a MGW 26. An H.248 message is sent from the Serving MSCe 50 to the MGW 26, and for this example, includes two ADD commands. The first ADD command establishes a termination for a bearer channel using RTP towards the packet network 22. The mode is set to sendrecv. If the Serving MSCe 50 elects to initiate Termination-Side ringback, then the MGW 26 initiates ringback from termination 5. The first ADD command includes SDP-4, which is the remote SDP including the connection information for the bearer entity supporting the calling party (for example, the MGW 20 supporting a call initiated by the mobile station 12). Connection information may include an IP Address and/or a User Datagram Protocol ("UDP") port number. Note that the ringback tone generated by the MGW 26 is not sent to the calling party. As mentioned in signaling step 509 the originating MSCe 48 controls all aspects of ringback to the calling party for multiple-termination routing scenarios. The bearer entity supporting the calling party will not allow such data to pass to the calling party until the bearer entity confirms that the data comes from a trusted source (such as a first responding device). In this manner, erroneous noise or sound transmission to the calling party is avoided. The Originating MSCe 48 controls the flow of the messaging to the network entities that support the calling party. Upon the Originating MSCe 48 response to the SIP INVITE of signaling step 501 with a 200 OK (INVITE) having an SDP (and the associated connection information of the trusted source), then the bearer entity supporting the calling party passes the received bearer data to the calling party.

The first ADD command may also contain a BT (Bearer Timer) parameter indicating, in seconds, the length of time MGW 26 waits without receiving data from the connection endpoint defined in SDP-4 before applying an error treatment to termination 5 (for example removing termination 5 from the bearer channel using RTP towards the packet network 22 and sending a message to the Serving MSCe 50 informing it of the action). The Serving MSCe 50, from the LEGINFO1 parameter in the Routereq message (signaling step 504), is aware that the call associated with TLDN1 is one termination of a multiple-termination routing scenario. In general the call setup time of a multiple-termination routing scenario is greater than the call setup time of a single termination scenario. The Serving MSCe 50 may, on a per call setup basis, adjust the value of BT based on knowledge it may have about the call setup.

The second ADD command establishes a termination for the base station 36 communication channel with a mode set to sendrecv. The second ADD command includes SDP-7, which is the remote SDP including the base station 36 connection information (that is information sent in signaling step 512 that relates to termination 7).

522 The MGW 26 replies to the H.248 message by sending a H.248 Reply message to Serving MSCe 50. The Reply message includes SDP-5 and SDP-6. SDP-5 is the local SDP for the termination given in SDP 4 and includes the MGW 26 connection information for termination 5. SDP-6 is the local SDP for the termination towards the base station 36 and includes the MGW 26 connection information (for example, IP address and UDP Port number) for termination 6.

523-26 The session progress signaling addresses the handshake operation between the Serving MSCe 50 and the Originating MSCe 48. The handshake operation between the Originating MSCe 48 and the Serving MSCe 50 operates to provide connection management for the call setup. The session progress signaling 523-26 will be discussed in detail with reference to FIG. 18.

526-27 After receiving the H.248 Reply message of signaling step 522, the Serving MSCe 50 sends an IOS Assignment Request message to the base station 36 to request assignment of radio resources. The Assignment Request message includes the MGW 26 connection information (for termination 6, obtained from signaling step 522), request for base station 36 transcoding (if necessary) and the codec assignment for the mobile station associated with TLDN1. After receiving an Assignment Request message in signaling step 526, the base station 36 sends an IOS Assignment Complete message to the Serving MSCe 50.

528-34 After the time value of NATIME in signaling step 507 has been exceeded, the call setup is released. Details of the release in signaling steps 528-34 will be discussed in detail with reference to FIG. 19.

535 Following a non-completion of the initiated call setup to the first of the plurality of potential terminating devices (in this example, the mobile station 40), the Originating MSCe 48, based upon the instructions in the TERMTRIG (Termination Triggers) parameter of signaling step 507 sends a TRANUMREQ to the home location register 52. The TRANUMREQ contains a REDREASON (RedirectionReason) parameter and the BILLID (Billing ID) associated with the first call setup. The Originating MSCe 48 may optionally include a TRANSCAP (TransactionCapability) parameter to indicate the Originating MSCe 50 transaction capability at the current time.

536-39 The next call features associated with the called number with respect to consecutively initiated call setups for the remaining potential terminating devices are retrieved next via the home location register 52. Retrieval of the call features for signaling steps 536-39 will be discussed in detail with reference to FIG. 20.

540 When the routreq is received by the home location register 52 in signaling steps 536-39, the HLR 52 returns a tranumreq to the Originating MSCe 48. The tranumreq includes multiple-termination routing information in the form of the TerminationList parameter, along with an indication of the reason for extending the incoming call (that is, for consecutively initiated multiple-termination routing) in the REDIND (DMH_RedirectionIndicator) parameter. In this scenario the TerminationList parameter includes the next termination for consecutively initiating terminations (that is, mobile station 46).

541 After receiving the tranumreq response from signaling step 540, the Originating MSCe 48 determines that the intersystem termination is associated with a MSCe, and that SIP-T/SIP is used for the call setup to the MSCe serving the termination device. The Originating MSCe 48 sends to the Serving MSCe an INVITE message that includes Call-ID2, TLDN2 and SDP-4 to setup a call to the second member of the member list (that is, the mobile station 46). The INVITE can include an encapsulated ISUP IAM message. Note that the Originating MSCe 48 can elect to modify SDP-4 as received in signaling step 501. Also, the INVITE request for this signaling step establishes a Dialog between the Originating MSCe 48 and the Serving MSCe 50, and is a different Dialog than that related to the INVITE request of signaling step 501, received by the Originating MSCe 48. The Serving MSCe 50 uses TDLN2 to make the association with MSID2 received in the ROUTREQ message of signaling step 537.

545-47 The ringing management between the Originating MSCe 48 and the Serving MSCe 50 prevents the Serving MSCe from controlling local ringback to the calling party. Ringing management 545-47 will be discussed in detail with reference to FIG. 21.

548 After receiving an INVITE message in signaling step 541, the Serving MSCe 50 sends to the base station 42 an IOS PAGING REQUEST, which initiates a mobile terminated call setup scenario for the mobile station associated with TLDN2 (that is, mobile station 46). The PAGING REQUEST message includes the "Desired Codec" for mobile station 46

549 When the mobile station 46 responds to the page, an IOS PAGING RESPONSE message is sent from the base station 42 to the Serving MSCe 50. The PAGING RESPONSE message includes the codec chosen by the terminating mobile. The PAGING RESPONSE message may contain a list of available base station transcoders, and the connection information for the base station 42 communications channel at termination 11.

555 The Serving MSCe 50 establishes a context with a MGW 27. An H.248 message is sent from Serving MSCe 50 to the MGW 27 including two ADD commands. The first ADD command establishes a termination for a bearer channel using RTP towards the packet network 22. The mode is set to sendrecv. If the Serving MSCe 50 elects to initiate Termination-Side ringback, the MGW 27 initiates ringback from termination 9. The first ADD command includes SDP-4, which is the remote SDP including the connection information for the bearer entity supporting the calling party (for example MGW 20 supporting a call initiated by mobile station 12). Connection information may include an IP Address and a User Datagram Protocol ("UDP") Port number.

Note that the MGW 26 generates a ringback tone that will not be received by the calling party. As mentioned in step 509 the Originating MSCe 48 controls all aspects of ringback to the calling party for multiple-termination routing scenarios. The bearer entity supporting the calling party will not allow received data to be passed to the calling party until the bearer entity is assured that the data is coming from a trusted source (such as a first responding terminal). The Originating MSCe 48 controls the flow of all messaging to the network entities support the calling party. As an example of a trusted source, the bearer entity that supports the calling party passes received bearer data (such as voice/sound data) to the calling party when a 200 OK (INVITE) including a SDP (with the connection information of the trusted source) sent by the Originating MSCe 48 in response to the SIP INVITE of signaling step 501.

The first ADD command may also contain a BT (Bearer Timer) parameter indicating, in seconds, the length of time MGW 27 waits without receiving data from the connection endpoint defined in SDP-4 before applying an error treatment to termination 9 (for example removing termination 9 from the bearer channel using RTP towards the packet network 22 and sending a message to the Serving MSCe 50 informing it of the action). The Serving MSCe 50, from the LEGINFO2 parameter in the Routereq message (signaling step 537), is aware that the call associated with TLDN2 is one termination of a multiple-termination routing scenario. In general the call setup time of a multiple-termination routing scenario is greater than the call setup time of a single termination scenario. The Serving MSCe 50 may, on a per call setup basis, adjust the value of BT based on knowledge it may have about the call setup.

The second ADD command establishes a termination for the base station 42 communication channel with a mode set to sendrecv. The second ADD command includes SDP-7, which is the remote SDP including the base station 42 connection information (that is, information sent in signaling step 547 that relates to termination 11).

556 The MGW 27 replies to the H.248 message by sending a H.248 Reply message to Serving MSCe 50. The Reply message includes SDP-9 and SDP-10. SDP-9 is the local SDP for the termination given in SDP-4 and includes the MGW 27 connection information for termination 9. SDP-10 is the local SDP for the termination towards the base station 42 and includes the MGW 27 connection information (for example, IP address and UDP Port number) for termination 10.

557-59 The session progress signaling addresses the handshake operation between the Serving MSCe 50 and the Originating MSCe 48, which provides connection management for the call setup. The session progress signaling 557-59 will be discussed in detail with reference to FIG. 22.

560-61 After receiving the H.248 Reply message of signaling step 556, the Serving MSCe 50 sends an IOS Assignment Request message to the base station 42 to request assignment of radio resources. The IOS Assignment Request message includes the MGW 27 connection information (for termination 10, obtained from signaling step 556), request of any base station 42 transcoding (if necessary) and the codec assignment for the mobile station associated with TDLN2.

After receiving an IOS Assignment Request message from signaling step 560, the base station 42 sends an IOS Assignment Complete message to the Serving MSCe 50.

562 The base station 42 sends an IOS CONNECT message to the Serving MSCe 50 to indicate that the call has been answered by the mobile station associated with TLDN2 (that is, mobile station 46).

563 If the Serving MSCe 50 elected in signaling step 555 to initiate Termination-Side ringback, then the Serving MSCe 50 sends a H.248 message to MGW 27. The H.248 message contains a MODIFY command to deactivate Termination-Side Ringback.

564 MGW 27 acknowledges the H.248 message of signaling step 562 by sending a H.248 Reply message to Serving MSCe 50.

565 After receiving the CONNECT message from the base station 42 and the PRACK message is received in signaling step 558 (see FIG. 22), the Serving MSCe 50 sends a 200 OK message to the Originating MSCe 48. When the INVITE request of signaling step 541 includes an ISUP IAM Message, then the 200 OK message can contain an ISUP ANM message. The 200 OK (INVITE) message acknowledges that the INVITE of signaling step 541 has succeeded.

566 Upon receiving a 200 OK message in signaling step 565, the Originating MSCe 48 sends a 200 OK message to the originator of the INVITE request of signaling step 501. Since the intersystem termination (that is, the mobile station 46) first answered and/or responded, the 200 OK message includes SDP-9 (that is the SDP received in signaling step 556). When the INVITE request of signaling step 501 includes an ISUP IAM message, then the 200 OK message can contain an ISUP ANM Message. The 200 OK message acknowledges that the INVITE of signaling step 501 message has succeeded.

567 The Originating MSCe 48 receives an ACK message. The ACK message confirms reception of the final response (that is, the 200 OK message of signaling step 566) for the Dialog identified by Call-ID0.

566 Upon receiving an ACK message in signaling step 567 for the Dialog identified by Call-ID0, the Originating MSCe 48 sends an ACK message to the Serving MSCe 50 to confirm reception of the final response (that is, 200 OK message of signaling step 566) for the Dialog identified by Call-ID2.

Figure 16:
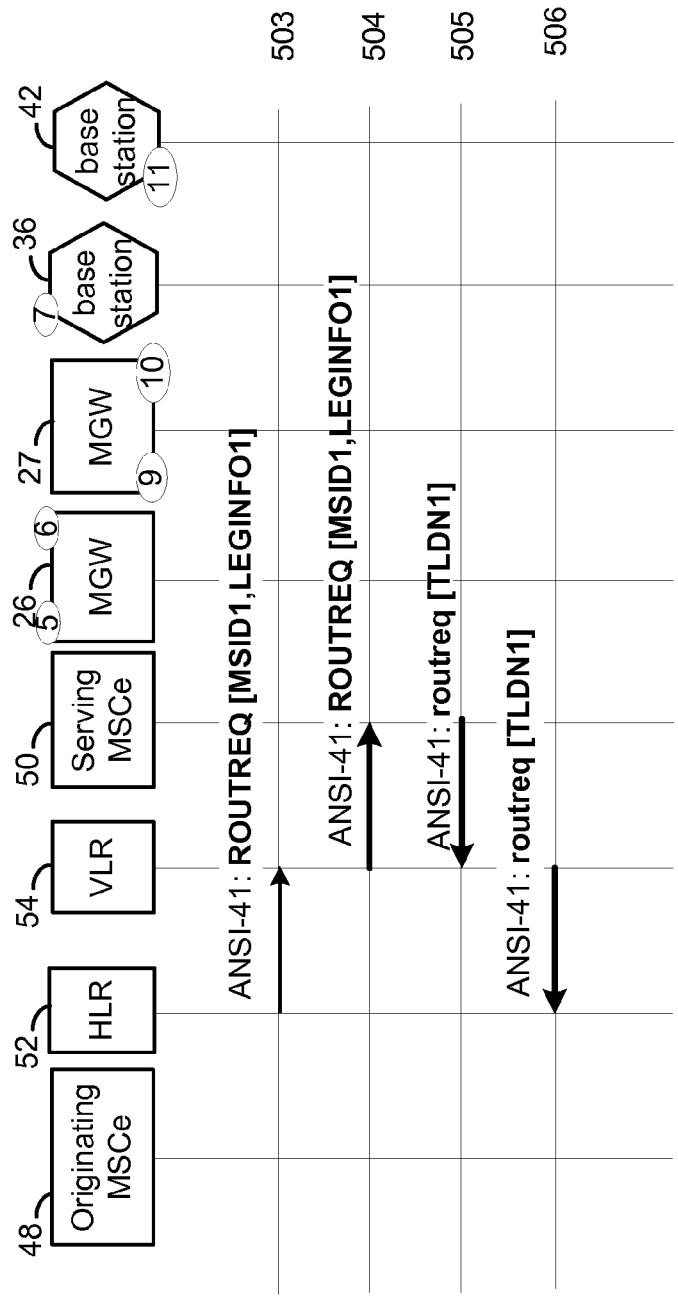

FIG. 16 is a signal flow diagram illustrating the retrieve call features signal sequence of FIG. 15a:

503-04 The HLR 52 recognizes the called number as a member of a multiple-termination routing and that, based on the received TransactionCapability parameter the Originating MSCe 48, is capable of supporting a multiple-termination routing to a plurality of potential terminating devices. In this case, the first member in the member list (that is, the mobile station 40) is registered in another system; therefore, a ROUTREQ is sent to the VLR 54, which forwards the ROUTREQ to the Serving MSCe 50.

505-06 In response to the ROUTREQ, the Serving MSCe 50 checks its internal data structures and determines that the mobile station 40 is currently idle (or in similar call-ready states, such as the call is involved in another call, but has a call waiting feature). The Serving MSCe 50 allocates a TLDN and returns this information to the VLR 54 in a routreq response. The VLR 54 sends a routreq to the HLR 52.

Figure 17:
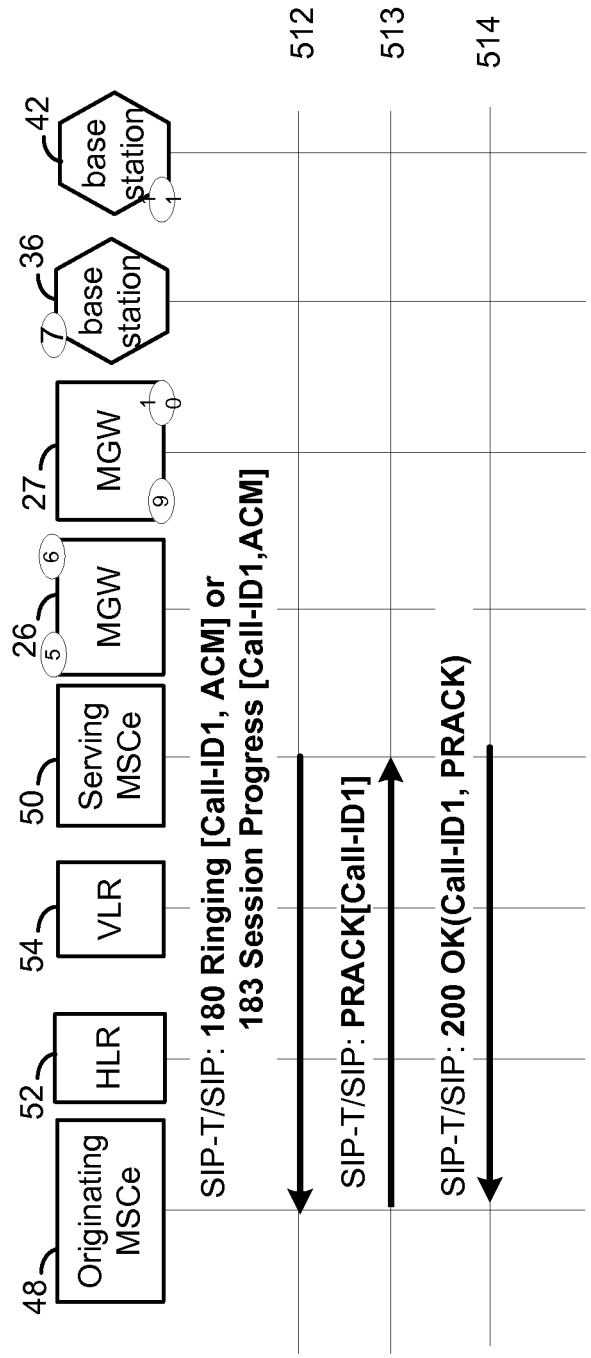

FIG. 17 is a signal flow diagram illustrating the ringing management signal sequence of FIG. 15a:

512 After receiving the INVITE of signaling step 508, if the INVITE request did not contain an ISUP IAM Message, the Serving MSCe 50 may send either a 180 Ringing message or a 183 Session Progress message to the Originating MSCe 48

When the INVITE request includes an ISUP IAM Message, the Serving MSCe 50 may send either a 180 Ringing message or a 183 Session Progress message including an ISUP ACM message to the Originating MSCe 48.

If the Serving MSCe elects to initiate local ringback then the 180 Ringing message is sent.

513 In response to the 180 Ringing message or a 183 Session Progress message of signaling step 512, a PRACK message is sent from the Originating MSCe 48 to the Serving MSCe 50.

514 The Serving MSCe 50 sends a 200 OK response to the Originating MSCe 48 in response to the PRACK message of signaling step 513.

Figure 18:
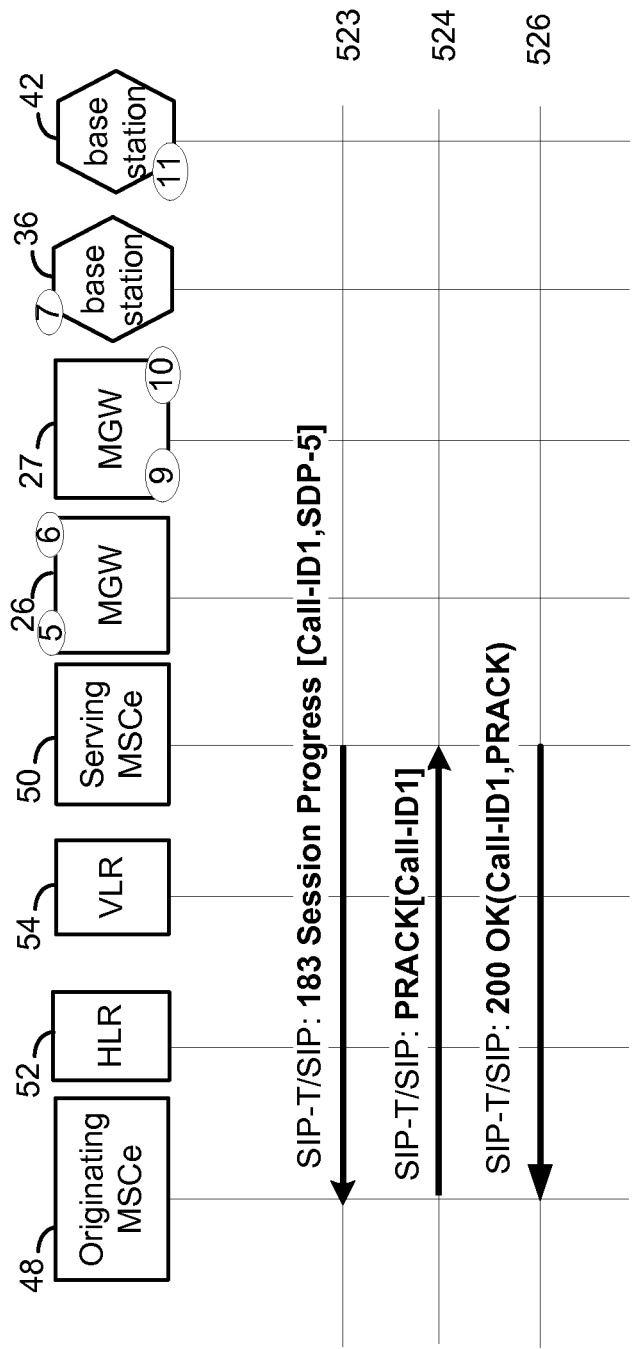

FIG. 18 is a signal flow diagram illustrating the detailed session progress signal sequence of FIG. 15a:

523 Upon receiving a H.248 Reply message to the ADD message in signaling step 522, the Serving MSCe 50 sends the Originating MSCe 48 a 183 Session Progress message including SDP-5.

Note the 183 Session Progress message is not sent to the originator of the INVITE message, signaling step 501.

524 In response to the 183 Session Progress message of signaling step 523, the Originating MSCe 48 stores SDP-5, and sends a PRACK message to the Serving MSCe 50.

525 The Serving MSCe 50 sends a response to the PRACK message of signaling step 524 to the Originating MSCe 48.

Figure 19:
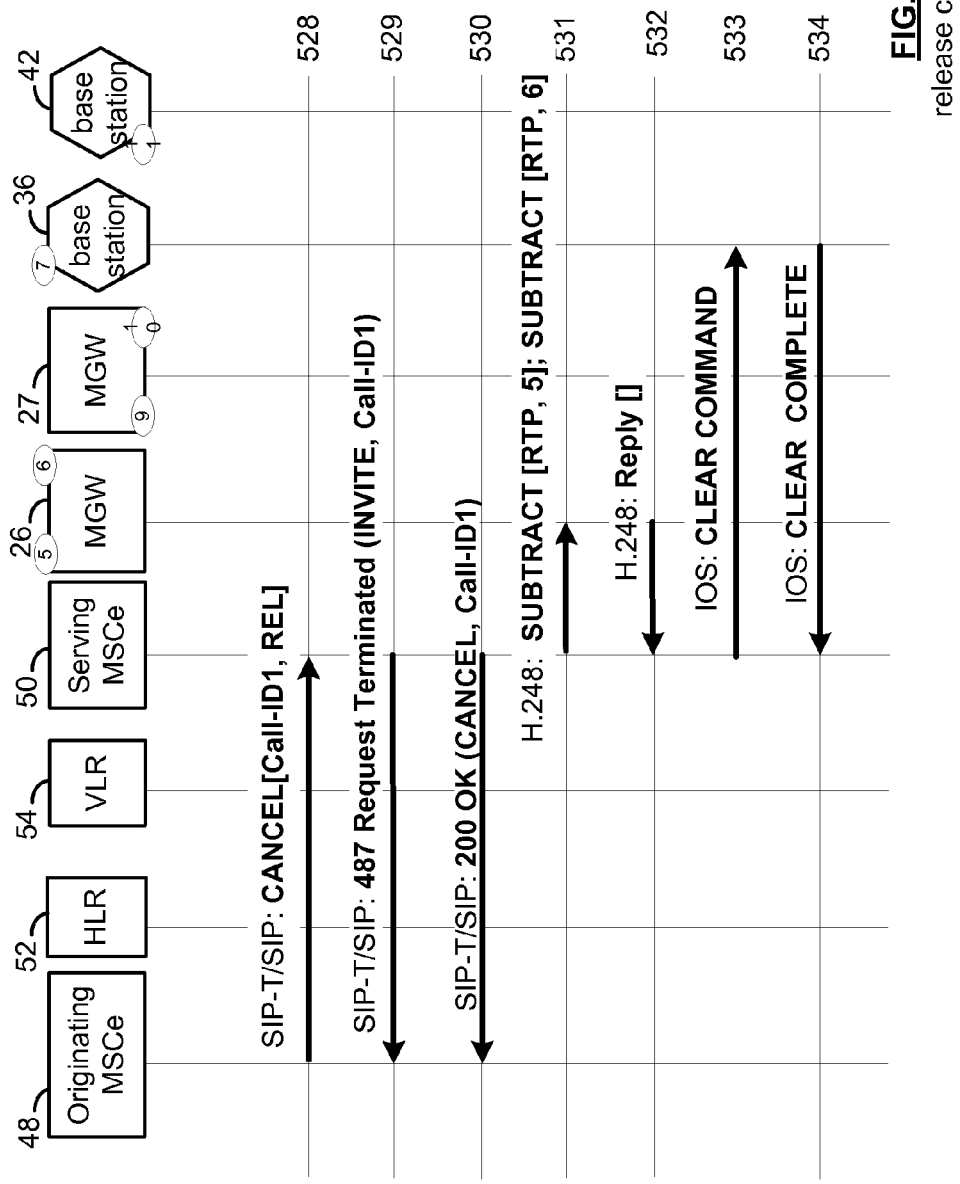

FIG. 19 is a signal sequence illustrating releasing the call setup of a potential terminating-device of FIG. 15a:

528 Following the passage of a time period given by the NATIME parameter of signaling step 507, the Originating MSCe 48 abandons the call setup attempt with mobile station 40. The Originating MSCe 48 sends a IOS CANCEL message to the Serving MSCe 50. When the INVITE request of signaling step 508 included an ISUP IAM Message then the CANCEL message may contain a ISUP REL message.

529 The Serving MSCe 50 sends a 487 Request Terminated message to the Originating MSCe 48. The 487 Request Terminated message is a response to the INVITE request of signaling step 508.

530 The Serving MSCe 50 answers the CANCEL request of signaling step 528 by sending a 200 OK message to the Originating MSCe 48.

531 Upon receiving a CANCEL message of signaling step 528 from the Originating MSCe 48, the Serving MSCe 50 starts releasing all resources associated with the call attempt to MSID-1 (that is, mobile station 40). The Serving MSCe 50 sends the MGW 26 a H.248 message consisting of two SUBTRACT commands. The first SUBTRACT command removes termination 6 to base station 36. The second SUBTRACT removes termination 5 for the bearer channel using RTP towards the packet network 22.

532 The MGW 26 replies to the H.248 message at signaling step 531 with a H.248 Reply message.

533 Upon receiving a CANCEL message at signaling step 528 from the Originating MSCe 48, the Serving MSCe 50 sends an IOS Clear Command to base station 36, instructing the base station 36 to release the associated dedicated resources.

534 The base station 36 sends an IOS Clear Complete message to the Serving MSCe 50. The Serving MSCe 50 releases the underlying transport connection.

Figure 20:
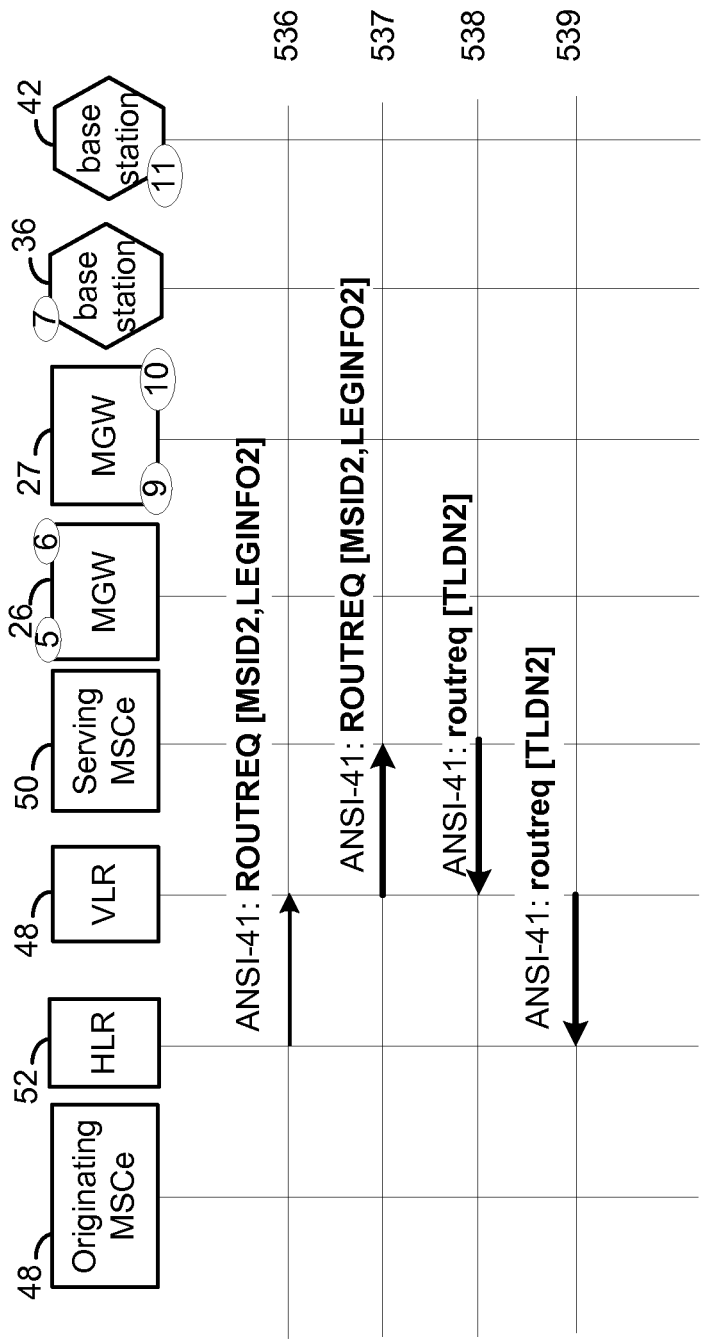
FIG. 20 is a signal flow diagram illustrating the next call features retrieval of signaling steps of FIG. 15b.

FIG. 20 is a signal flow diagram illustrating the next call features retrieval of signaling steps 536-539 of FIG. 15b:

536-37 Upon receiving the TRANUMREQ from the Originating MSCe 48, the HLR 52 recognizes the Billing ID or the PilotNumber (the called number for signaling step 501) to relate the request to the information provide in the locreq, signaling step 507. The HLR 52 associates the PilotNumber to the multiple-termination routing feature, and that, based on the received TransactionCapability parameter, the Originating MSCe 48 is capable of supporting a multiple-termination call. In this case, the second MSID in the member list (that is, mobile station 46) is registered in the same network system as MSID2. A ROUTREQ is sent to the VLR 54, which forwards the ROUTREQ to the Serving MSCe 50.

538-39 In response to the ROUTREQ, the Serving MSCe 50 checks its internal data structures and determines that the mobile station 46 is currently idle (or in similar call-ready states, such as the call is involved in another call, but has a call waiting feature). The Serving MSCe 50 then allocates a TLDN2 and returns this information to the VLR 54 in a routreq. The VLR 54 sends a routreq to the home location register 52.

Figure 21:
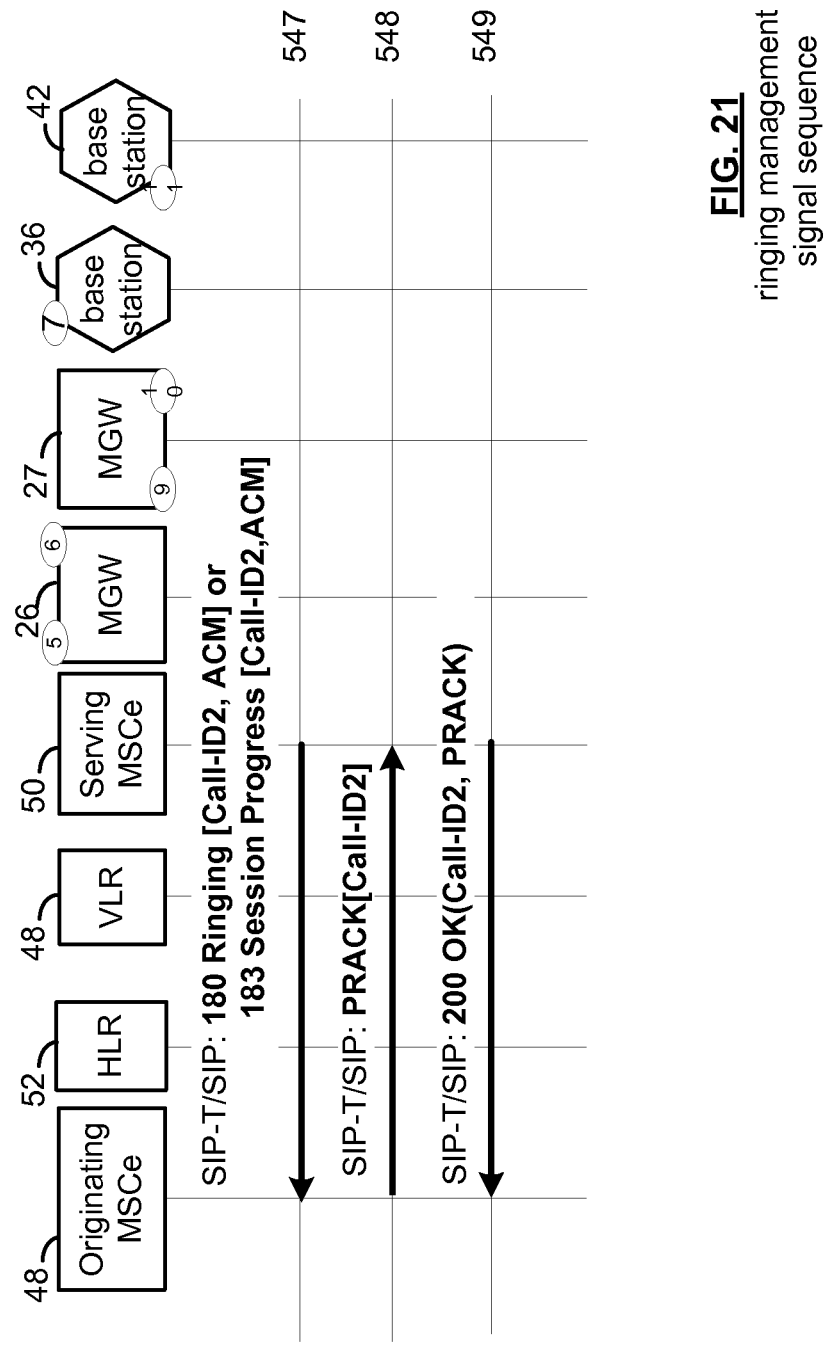
FIG. 21 is a signal flow diagram illustrating the ringing management signal sequence of FIG. 15b.

FIG. 21 is a signal flow diagram illustrating the ringing management signal sequence of FIG. 15*b*:

545 After receiving the INVITE of signaling step 541, if the INVITE request did not contain an ISUP IAM Message, the Serving MSCe 50 may send either a 180 Ringing message or a 183 Session Progress message to the Originating MSCe 48.

When the INVITE request includes an ISUP IAM Message, the Serving MSCe 50 may send either a 180 Ringing message or a 183 Session Progress message including an ISUP ACM message to the Originating MSCe 48.

If the Serving MSCe elects to initiate local ringback then the 180 Ringing message is sent.

546 In response to the 180 Ringing message or a 183 Session Progress message of signaling step 512, a PRACK message is sent from the Originating MSCe 48 to the Serving MSCe 50.

547 The Serving MSCe 50 sends a 200 OK response to the Originating MSCe 48 in response to the PRACK message of signaling step 548.

Figure 22:
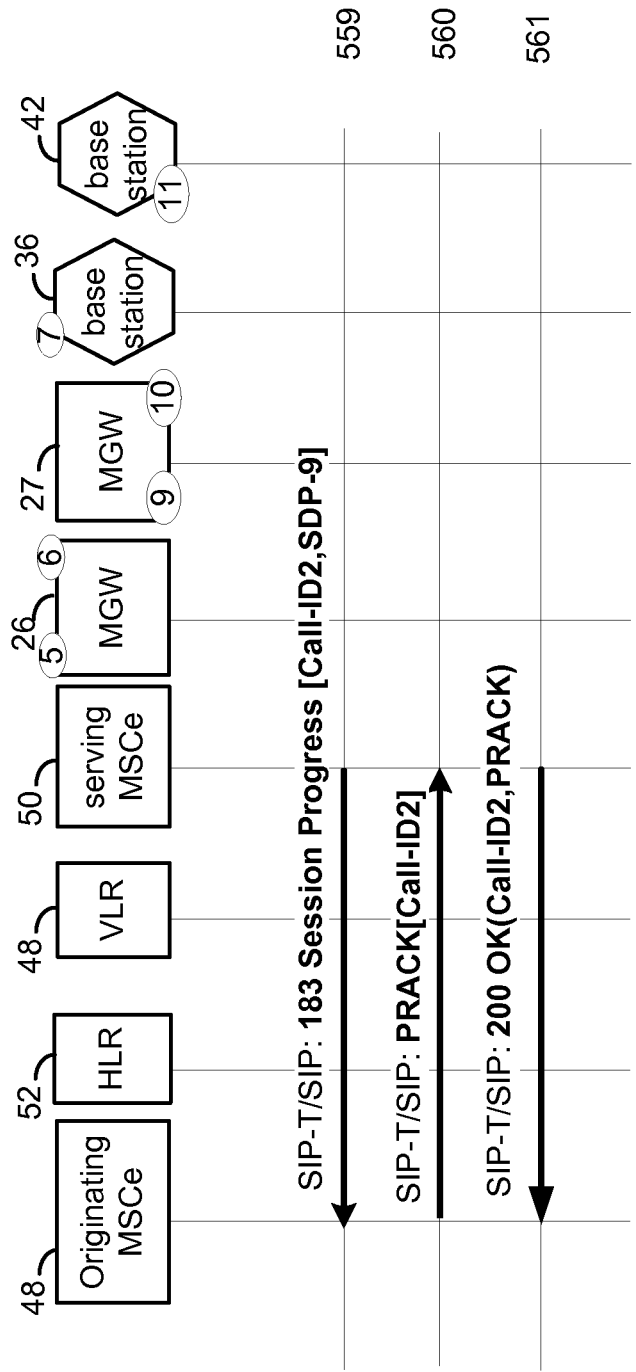
FIG. 22 is a signal flow diagram illustrating the detailed session progress signal sequence of FIG. 15b.

FIG. 22 is a signal flow diagram illustrating the detailed session progress signal sequence of FIG. 15*b*. The Originating MSCe 48 coordinates the multiple-termination routing for connection management. Generally, the signal flow of FIG. 22 reflects that the Serving MSCe 50 seeks to move the ringback to the terminating end of a call. When the Serving MSCe 50 does not seek to move the ringback to the terminating end of a call, the Serving MSCe 50 provides a 180 Ringing message with alert information (to update the SDP and to indicate to continue ringing).

As one of ordinary skill in the art would appreciate, the SDP may also be updated at a later point (such as with the 200 OK (Invite) at signaling step 564). Note that even through the Serving MSCe 50 might seek to initiate termination-side ringback, the Originating MSCe 48 controls all aspects of ringback to the calling party for multiple-termination routing scenarios. The bearer entity supporting the calling party will not pass received data to the calling party until the bearer entity is assured that the data is coming from a trusted source. The Originating MSCe 48 controls the flow of all messaging to the network entities support the calling party. In the present example, the bearer entity will pass received bearer data to the calling party when the Originating MSCe 48 sends a 200 OK (INVITE) including a SDP (with the connection information of the trusted source) in response to the SIP INVITE of signaling step 501.

559 Upon receiving a H.248 Reply message to the ADD message in signaling step 556, the Serving MSCe 50 sends the Originating MSCe 48 a 183 Session Progress message including SDP-9.

560 In response to the 183 Session Progress message of signaling step 559, the Originating MSCe 48 stores SDP-9, and sends a PRACK message to the Serving MSCe 50.

561 The Serving MSCe 50 sends a response to the PRACK message of signaling step 560 to the Originating MSCe 48.

FIG. 23 is a flow diagram of a method 600 for multiple-termination routing in a wireless environment that includes an Internet Protocol ("IP") core. Beginning at step 602, a call delivery request is received. The call delivery request is based upon intelligent network protocols and includes a called number. In this regard, the call delivery request may be based on ISUP protocols (for example, from a PSTN network 32) or based on SIP protocols (for example, a SIP INVITE request from a packet network 22).

With the called number, associated call features are retrieved at step 604. The call feature retrieval uses ANSI-41 protocols, such as with a LOCREQ (LocationRequest) invoke message, which returns an ANSI-41 location request response ("locreq"). Within the location request response are the call features associated with the called number.

At step 608, a determination is made as to whether the call features include multiple-termination routing information to a plurality of potential terminating devices. The call features include multiple-termination routing information in the form of a parameter, such as a TERMLIST (TerminationList) parameter. The multiple-termination routing information provides a member list of the potential terminating devices, and information indicating when to request further instructions on call processing relating to the device of the plurality of potential terminating devices.

When the call features include multiple-termination routing information at step 610, wherein at least one termination to be setup utilizes Session Initiation Protocol ("SIP"), call setups are initiated to each of the plurality of potential terminating devices. The multiple-termination routing information provides the manner and/or sequence for initiating the call setups.

For example, the initiation of the call setup to each of the plurality of potential terminating devices may be conducted consecutively. The received call setup provisional responses (for example, those including a session description protocol (SDP)) provides connection information used for establishing a bearer path (that is, a path for voice and/or data) for the call setup. Upon detection of a first potential terminating device to complete the call setup, initiation of subsequent call setups is foregone to any remaining potential terminating devices.

As another example, the initiation of the call setup to each of the plurality of potential terminating devices may be conducted concurrently. The received provisional responses (for example, those including a session description protocol (SDP)) for each call setup provides connection information used for establishing a bearer path (that is, a path for voice and/or data) for the call setup. Upon detection of a first potential terminating device to complete the call setup, call setups is to any of the remaining potential terminating devices is released.

The invention disclosed herein is susceptible to various modifications and alternative forms. Specific embodiments therefore have been shown by way of example in the drawings and detailed description. It should be understood, however, that the drawings and the detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for multiple-termination routing in a wireless network environment, the method comprising:

receiving a call delivery request, wherein the call delivery request includes a called number;

determining call features associated with the called number;

determining whether the call features include multiple-termination routing information to a plurality of potential terminating devices;

when the call features include multiple-termination routing information including at least one termination to be routed utilizing Session Initiation Protocol ("SIP"), initiating a call setup to each of the plurality of potential terminating devices; and when the potential terminating device is a public switched telephone network ("PSTN")-protocol based device, sustaining signaling communication with a media gateway for enabling the PSTN-protocol based device to interwork with an Internet Protocol ("IP") core while initiating the call setup to each of the plurality of potential terminating devices.

2. The method of claim 1, further comprising:

when the call delivery request is a SIP INVITE, responding to the received call delivery request with a ringback message, wherein the ringback message instructs the sender of the call delivery request to generate ringback to the calling party terminating device.

3. The method of claim 1, wherein said initiating a call setup to each of the plurality of potential terminating devices comprises:

consecutively initiating the call setup to each of the plurality of potential terminating devices;

extending a call setup leg to the consecutively initiated call setups in response to a received provisional response, wherein the received provisional response provides call connection information to be used for establishing a bearer path; and upon detecting a first potential terminating device to complete the call setup, foregoing initiation of the subsequent call setup to any of the remaining potential terminating devices.

4. The method of claim 1, wherein said initiating the call setup to each of the plurality of potential terminating devices comprises:

concurrently initiating the call setup to each of the plurality of potential terminating devices;

extending a call setup leg to each of the concurrently initiated call setups in response to a received provisional response, wherein the received provisional response provides call connection information that is to be used for establishing a bearer path; and upon detecting a first potential terminating device to complete the call setup, releasing the call setup to any of the remaining potential terminating devices.

5. The method of claim 1, wherein the multiple-termination routing information comprises:

a member list providing the plurality of potential terminating devices; and information indicating when to request instructions on call processing relating to a device of the plurality of potential terminating devices.

6. The method of claim 1, further comprising:

providing timing information as to when to invoke error treatment for a plurality of bearers for the call setup.

7. A switching center, comprising:

one or more processors; and one or more memory mediums coupled to the one or more processors, wherein the one or more memory mediums store program instructions that are executable by the one or more processors to:

receive a call delivery request, wherein the call delivery request includes a called number;

determine call features associated with the called number;

determine whether the call features include multiple-termination routing information to a plurality of potential terminating devices;

when the call features include multiple-termination routing information including at least one termination to be routed utilizing Session Initiation Protocol ("SIP"), initiate a call setup to each of the plurality of potential terminating devices; and when the potential terminating device is a public switched telephone network ("PSTN")-protocol based device, sustain signaling communication with a media gateway for enabling the PSTN-protocol based device to interwork with an Internet Protocol ("IP") core while initiating the call setup to each of the plurality of potential terminating devices.

8. The switching center of claim 7, wherein the program instructions are further executable to:

when the call delivery request is a SIP INVITE, respond to the received call delivery request with a ringback message that instructs the sender of the call delivery request to generate ringback to the calling party terminating device.

9. The switching center of claim 7, wherein the program instructions are further executable to:

consecutively initiate the call setup to each of the plurality of potential terminating devices;

extend a call setup leg to the consecutively initiated call setups in response to a received provisional response, wherein the received provisional response provides call connection information to be used for establishing a bearer path; and upon detecting a first potential terminating device to complete the call setup, foregoing initiation of a subsequent call setup to the remaining potential terminating devices.

10. The switching center of claim 7, wherein the program instructions are further executable to:

concurrently initiate the call setup to each of the plurality of potential terminating devices;

extend a call setup leg to each of the concurrently initiated call setups in response to a received provisional response, wherein the received provisional response provides call connection information that is to be used for establishing a bearer path; and upon detecting a first potential terminating device to complete the call setup, release the call setup to any of the remaining potential terminating devices.

11. The switching center of claim 7, wherein the multiple-termination routing information comprises:

a member list providing the plurality of potential terminating devices; and information indicating when to request instructions on call processing relating to a device of the plurality of potential terminating devices.

12. A non-transitory, computer accessible memory medium storing program instructions for multiple-termination routing in an wireless network, wherein the program instructions are executable by a processor to:

receive a call delivery request, wherein the call delivery request includes a called number;

determine call features associated with the called number;

determine whether the call features include multiple-termination routing information to a plurality of potential terminating devices;

when the call features include multiple-termination routing information including at least one termination to be routed utilizing Session Initiation Protocol ("SIP"), initiate a call setup to each of the plurality of potential terminating devices; and when the potential terminating device is a public switched telephone network ("PSTN")-protocol based device, sustain signaling communication with a media gateway for enabling the PSTN-protocol based device to interwork with an Internet Protocol ("IP") core while initiating the call setup to each of the plurality of potential terminating devices.

13. The non-transitory, computer accessible memory medium of claim 12, wherein the program instructions are further executable to:
when the call delivery request is a SIP INVITE, respond to the received call delivery request with a ringback message, wherein the ringback message instructs the sender of the call delivery request to generate ringback to the calling party terminating device.

14. The non-transitory, computer accessible memory medium of claim 12, wherein said initiating a call setup to each of the plurality of potential terminating devices comprises:
consecutively initiating the call setup to each of the plurality of potential terminating devices;
extending a call setup leg to the consecutively initiated call setups in response to a received provisional response, wherein the received provisional response provides call connection information to be used for establishing a bearer path; and
upon detecting a first potential terminating device to complete the call setup, foregoing initiation of the subsequent call setup to any of the remaining potential terminating devices.

15. The non-transitory, computer accessible memory medium of claim 12, wherein said initiating the call setup to each of the plurality of potential terminating devices comprises:
concurrently initiating the call setup to each of the plurality of potential terminating devices;
extending a call setup leg to each of the concurrently initiated call setups in response to a received provisional response, wherein the received provisional response provides call connection information that is to be used for establishing a bearer path; and
upon detecting a first potential terminating device to complete the call setup, releasing the call setup to any of the remaining potential terminating devices.

16. The non-transitory, computer accessible memory medium of claim 12, wherein the multiple-termination routing information comprises:
a member list providing the plurality of potential terminating devices; and
information indicating when to request instructions on call processing relating to a device of the plurality of potential terminating devices.

17. The non-transitory, computer accessible memory medium of claim 12, wherein the program instructions are further executable to:
provide timing information as to when to invoke error treatment for a plurality of bearers for the call setup.

* * * * *